(12) United States Patent
Ogata et al.

(10) Patent No.: US 9,188,078 B2
(45) Date of Patent: Nov. 17, 2015

(54) CONTROL APPARATUS OF INTERNAL COMBUSTION ENGINE

(75) Inventors: Kenichiroh Ogata, Hitachinaka (JP); Kenichi Machida, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 111 days.

(21) Appl. No.: 13/884,684

(22) PCT Filed: Dec. 6, 2011

(86) PCT No.: PCT/JP2011/078121
§ 371 (c)(1), (2), (4) Date: May 10, 2013

(87) PCT Pub. No.: WO2012/086398
PCT Pub. Date: Jun. 28, 2012

(65) Prior Publication Data
US 2013/0261938 A1    Oct. 3, 2013

(30) Foreign Application Priority Data
Dec. 20, 2010    (JP) ................ 2010-283094

(51) Int. Cl.
*F01L 1/34* (2006.01)
*F02D 43/04* (2006.01)
(Continued)

(52) U.S. Cl.
CPC .............. *F02D 43/04* (2013.01); *B60W 10/06* (2013.01); *B60W 10/08* (2013.01); *B60W 20/10* (2013.01);
(Continued)

(58) Field of Classification Search
CPC ..... F02D 43/04; F02D 41/40; F02D 41/3035; F02D 41/0007; F02D 41/1498; F02D 29/06; B60W 10/08; B60W 10/06; B60W 20/10; B60W 2710/0627; Y02T 10/144; Y02T 10/6286; Y02T 10/44; Y02T 10/56

USPC .......... 123/305, 295, 90.15, 90.16, 301, 435, 123/436, 475, 406.42, 406.58, 430; 701/103, 102, 104, 105, 110, 101
See application file for complete search history.

(56) References Cited

U.S. PATENT DOCUMENTS

| | | | |
|---|---|---|---|
| 5,604,303 A * | 2/1997 | Tomisawa et al. | ......... 73/114.06 |
| 6,178,947 B1 * | 1/2001 | Machida et al. | ............. 123/396 |

(Continued)

FOREIGN PATENT DOCUMENTS

| JP | 2000-320355 A | 11/2000 |
|---|---|---|
| JP | 2002-138893 A | 5/2002 |

(Continued)

OTHER PUBLICATIONS

Corresponding International Search Report with English Translation dated Feb. 21, 2012 (four (4) pages).

*Primary Examiner* — Thomas Moulis
*Assistant Examiner* — Joseph Dallo
(74) *Attorney, Agent, or Firm* — Crowell & Moring LLP

(57) ABSTRACT

An object of the present invention is to obtain a control apparatus of an internal combustion engine capable of respectively accurately detecting a combustion change in a plurality of combustion modes. In the present invention, the control apparatus of the internal combustion engine operable upon switching the combustion mode sets a detection time and a detection duration to detect a sensor signal of a crank angle sensor 10 in accordance with the combustion mode, and determines whether or not there is the combustion change based on the sensor signal detected by the crank angle sensor 10 at the detection time and for the detection duration set by the control apparatus.

12 Claims, 20 Drawing Sheets

(51) Int. Cl.
*F02D 29/06* (2006.01)
*F02D 41/14* (2006.01)
*F02D 41/30* (2006.01)
*F02D 41/40* (2006.01)
*B60W 10/06* (2006.01)
*B60W 10/08* (2006.01)
*B60W 20/00* (2006.01)
*F02D 41/00* (2006.01)

(52) U.S. Cl.
CPC ............ *F02D 29/06* (2013.01); *F02D 41/0007* (2013.01); *F02D 41/1498* (2013.01); *F02D 41/3035* (2013.01); *F02D 41/40* (2013.01); *B60W 2710/0627* (2013.01); *F02D 41/0002* (2013.01); *F02D 41/009* (2013.01); *F02D 41/0057* (2013.01); *F02D 2041/001* (2013.01); *F02D 2200/1012* (2013.01); *Y02T 10/144* (2013.01); *Y02T 10/44* (2013.01); *Y02T 10/56* (2013.01); *Y02T 10/6286* (2013.01)

(56) References Cited

U.S. PATENT DOCUMENTS

| | | | |
|---|---|---|---|
| 6,644,274 | B2 | 11/2003 | Hasegawa et al. |
| 2006/0102147 | A1* | 5/2006 | Norimoto et al. ........ 123/406.47 |
| 2007/0240653 | A1* | 10/2007 | Petridis ...................... 123/90.16 |
| 2008/0147300 | A1* | 6/2008 | Kakuya et al. ................. 701/103 |
| 2008/0289600 | A1* | 11/2008 | Kurotani et al. .............. 123/304 |
| 2009/0018747 | A1* | 1/2009 | Nitta .............................. 701/102 |
| 2009/0048760 | A1* | 2/2009 | Chen et al. .................... 701/103 |
| 2009/0199817 | A1* | 8/2009 | Mikasa .................... 123/406.19 |
| 2009/0265085 | A1* | 10/2009 | Hori .............................. 701/112 |
| 2009/0293842 | A1* | 12/2009 | Akazaki et al. .......... 123/406.41 |
| 2010/0274463 | A1* | 10/2010 | Itoga et al. .................... 701/102 |

FOREIGN PATENT DOCUMENTS

| | | |
|---|---|---|
| JP | 2002-195105 A | 7/2002 |
| JP | 2004-176607 A | 6/2004 |
| JP | 2007-303302 A | 11/2007 |
| JP | 2008-106782 A | 5/2008 |
| JP | 2008-289318 A | 11/2008 |

* cited by examiner

US 9,188,078 B2

CONTROL APPARATUS OF INTERNAL COMBUSTION ENGINE

TECHNICAL FIELD

The present invention relates to a control apparatus of an internal combustion engine operable upon switching a combustion mode.

BACKGROUND ART

In an internal combustion engine provided with a crank angle sensor for detecting a rotation state of a crankshaft, there is known control for detecting generation of a combustion change and stabilizing the combustion change.

However, in a case where the combustion change of the internal combustion engine is detected and suppressed, a detection means for information showing an indicator of the combustion change and a suppression means are not clear.

Meanwhile, there is a known control apparatus of an internal combustion engine including a combustion parameter control means for controlling a combustion parameter acting on combustion of the internal combustion engine, and including a combustion state detection means for, when the combustion parameter acting on the combustion of the internal combustion engine is altered by the combustion parameter control means, sampling information for detecting a combustion state based on the altered combustion parameter at a predetermined timing (for example, see PTL 1).

According to PTL 1, it is determined whether or not it is an ignition time. When the ignition time is determined, it is determined whether or not a 30° CA signal is detected after the ignition time is determined. When the 30° CA signal is not detected, it is not a detection time of a rotational velocity Ne. In a case where the 30° CA signal is detected, a processing of calculating the rotational velocity in accordance with the ignition time is performed. In such a way, PTL 1 describes that since the rotational velocity is detected in accordance with the ignition time, the combustion state can be detected even upon altering the ignition time.

CITATION LIST

Patent Literature

PTL 1: Japanese Patent Application Laid-Open No. 2002-138893

SUMMARY OF INVENTION

Technical Problem

The conventional technique described above is to sample the combustion state at timings of the ignition time and an open time of an exhaust valve. Thus, the technique cannot be applied to a different combustion mode such as compression ignited combustion in which no ignition is performed or there is no combustion change due to ignition.

In the compression ignited combustion, although a timing of a close time of the exhaust valve is the same as spark ignited combustion, a combustion duration is very short in comparison to the spark ignited combustion. Thus, in a case of sampling at the timing of the open time of the exhaust valve as in the conventional technique, detection precision of the combustion change is lowered. Therefore, control is performed based on low detection precision, so that suppression control of the combustion change cannot be accurately performed.

The present invention is achieved under the above circumstances, and an object thereof is to obtain a control apparatus of an internal combustion engine capable of respectively accurately detecting a combustion change in a plurality of combustion modes.

Solution to Problem

In order to solve the above problems, for example, configurations described in the claims are adopted. The present application includes a plurality of means for solving the above problems. Taking one example thereof, a control apparatus of an internal combustion engine operable upon switching a combustion mode sets a detection time and a detection duration to detect a sensor signal of a crank angle sensor in accordance with the combustion mode, and determines whether or not there is the combustion change based on the sensor signal detected by the crank angle sensor at the detection time and for the detection duration set by the control apparatus.

Advantageous Effects of Invention

According to the invention, the combustion change in the combustion modes can be accurately detected. Therefore, based on the detected combustion change, combustion stabilization control for improving combustion stability of the internal combustion engine can be performed. Problems, configurations, and effects other than those described above will be elucidated by the following description of embodiments.

It should be noted that the present specification includes the contents described in the specification and/or the drawings of Japanese Patent Application No. 2010-283094 which is a basis of the priority of the present application.

DESCRIPTION OF EMBODIMENTS

Next, embodiments in which a control apparatus of an internal combustion engine of the present invention is applied will be described.

[First Embodiment]

Figure 1:
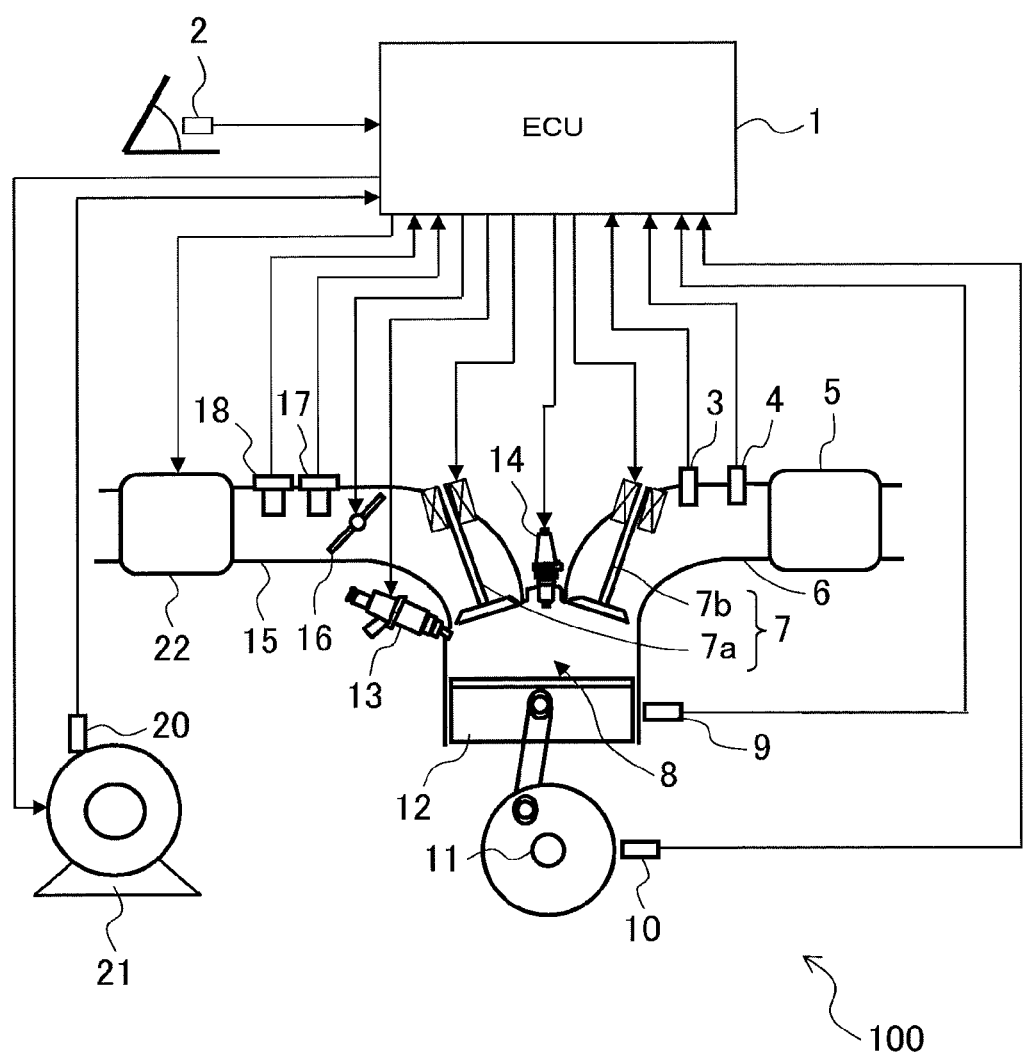
[FIG. 1] A diagram for illustrating a system configuration of an automobile gasoline engine to which a control apparatus of an internal combustion engine in a first embodiment is applied.

FIG. 1 is a diagram for illustrating a system configuration of an automobile gasoline engine to which a control apparatus of an internal combustion engine in a first embodiment is applied.

An engine 100 is an automobile gasoline engine (internal combustion engine) operable upon switching a combustion mode at least between spark ignited combustion and compression ignited combustion. An air flow sensor 18 for measuring a suctioned air amount, an electronic control throttle 16 for adjusting an intake pipe pressure, an intake temperature sensor 17 serving as one mode of a suctioned air temperature detector for measuring a temperature of the suctioned air, and a supercharger 22 for compressing the suctioned air are provided at respectively appropriate positions of an intake pipe 15. The supercharger 22 may be not included. The air flow sensor may be a suctioned air pressure sensor 18. In the engine 100, a fuel injection device (hereinafter, referred to as the "injector") 13 for injecting fuel into a combustion chamber 8 of the cylinder and an ignition plug 14 for supplying an ignition energy are provided for each cylinder. A cooling water temperature sensor 9 for measuring a temperature of cooling water of the engine is provided at an appropriate position of the engine 100. The injector 13 for injecting the fuel into the combustion chamber 8 of the cylinder may be provided at an appropriate position of the intake pipe 15. Variable valve mechanisms each having an intake valve variable device 7a for adjusting a suction gas flowing into the cylinder and an exhaust valve variable device 7b for adjusting a discharge gas flowing out from the cylinder are provided at respectively appropriate positions of the engine 100. By adjusting the variable valve mechanisms 7, a suction gas amount and an internal EGR amount (residual gas amount) are adjusted.

Further, in the engine 100, a fuel pump 21 serving as one mode of a pressure adjuster for supplying the fuel to the injector 13 is provided at an appropriate position of the engine 100. A fuel pressure sensor 20 serving as one mode of a fuel pressure detector for measuring a pressure of the fuel is provided in the fuel pump 21.

Further, a ternary catalyst 5 for purifying an exhaust, an air-fuel ratio sensor 4 serving as one mode of an air-fuel ratio detector for detecting an air-fuel ratio of the exhaust on the upstream side of the ternary catalyst 5, and an exhaust temperature sensor 3 serving as one mode of an exhaust temperature detector for measuring a temperature of the exhaust on the upstream side of the ternary catalyst 5 are provided at respectively appropriate positions of an exhaust pipe 6. In a crankshaft 11, a crank angle sensor 10 for detecting an angle and an angular velocity of the crankshaft 11 and a moving velocity of a piston 12 is provided.

Signals obtained from the air flow sensor 18, the intake temperature sensor 17, the cooling water temperature sensor 9, the fuel pressure sensor 20, the air-fuel ratio sensor 4, and the exhaust temperature sensor 3 are sent to an engine control unit (ECU) 1. A signal obtained from an accelerator opening sensor 2 is sent to the ECU 1. The accelerator opening sensor 2 detects a press-down amount of an accelerator pedal, that is, an accelerator opening. The ECU 1 calculates a requested torque based on the output signal of the accelerator opening sensor 2. That is, the accelerator opening sensor 2 is used as a requested torque detection sensor for detecting the requested torque to the engine 100. The ECU 1 also calculates the angle and the angular velocity of the crankshaft 11, the moving velocity of the piston 12, and an engine rotational velocity based on an output signal of the crank angle sensor 10. The ECU 1 optimally calculates major activation amounts of the engine 100 such as an air flow rate, a fuel injection amount, an ignition time, and an EGR amount based on an operation state of the engine 100 obtained from the outputs of the various sensors.

The fuel injection amount calculated in the ECU 1 is converted into an open valve pulse signal and sent to the injector 13. An ignition plug drive signal is sent to the ignition plug 14 so that ignition is performed at the ignition time calculated in the ECU 1. A throttle opening calculated in the ECU 1 is sent to the electronic control throttle 16 as a throttle drive signal. A variable valve activation amount calculated in the ECU 1 is sent to the variable valve mechanisms 7 as a variable valve drive signal. A fuel pump activation amount calculated in the ECU 1 is sent to the fuel pump 21 as a fuel pump drive signal. An activation amount of the supercharger 22 calculated in the ECU 1 is sent to the supercharger 22 as a supercharger drive signal.

The fuel is injected to the air flowing into the combustion chamber 8 from the intake pipe 15 through an intake valve, so that an air-fuel mixture is formed. The air-fuel mixture is exploded by a spark generated from the ignition plug 14 at a predetermined ignition time in a case of the spark ignited combustion, and exploded by being compressed by the piston 12 in the combustion chamber in a case of the compression ignited combustion, and the piston 12 is pushed down by a combustion pressure so as to produce a drive force of the engine 100. Further, the exhaust after explosion is sent to the ternary catalyst 5 via the exhaust pipe 6, and an exhaust component is purified in the ternary catalyst 5 and discharged to an exterior.

Figure 2:
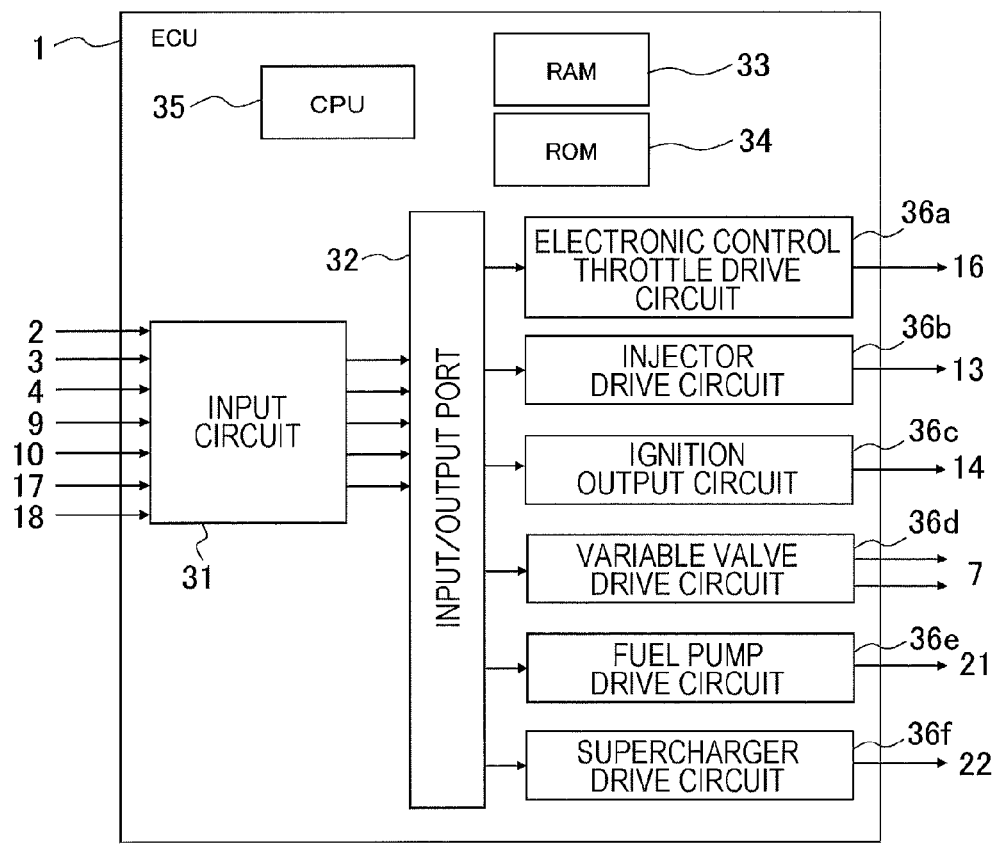
[FIG. 2] A diagram for illustrating an internal configuration of an ECU in the first embodiment.

FIG. 2 is a diagram for illustrating an internal configuration of the ECU.

The ECU 1 has an input circuit 31. The output signals of the accelerator opening sensor 2, the exhaust temperature sensor 3, the air-fuel ratio sensor 4, the cooling water temperature sensor 9, the crank angle sensor 10, the intake temperature sensor 17, the air flow sensor 18, and the fuel pressure sensor 20 are input to the input circuit 31. However, input signals to be input to the input circuit 31 are not limited to the above signals. The input signals of the sensors input to the input circuit 31 are sent to an input port in an input/output port 32. Values sent to the input port of the input/output port 32 are stored in a RAM 33, and calculated in a CPU 35. A control program describing calculation processing contents is preliminarily written in a ROM 34.

The values indicating activation amounts of actuators calculated in accordance with the control program are stored in the RAM 33 and then sent to an output port of the input/output port 32 and sent to the actuators via drive circuits 36a to 36f. In a case of the present embodiment, the drive circuits include an electronic control throttle drive circuit 36a, an injector drive circuit 36b, an ignition output circuit 36c, a variable valve drive circuit 36d, a fuel pump drive circuit 36e, and a supercharger drive circuit 36f. The drive circuits 36a to 36f respectively control the electronic control throttle 16, the injector 13, the ignition plug 14, the variable valve mechanisms 7, the fuel pump 21, and the supercharger 22. In the present embodiment, the apparatus is provided with the drive circuits 36a to 36f in the ECU 1. However, the present invention is not limited to this but any of the drive circuits 36a to 36f may be provided in the ECU 1.

Figure 3:
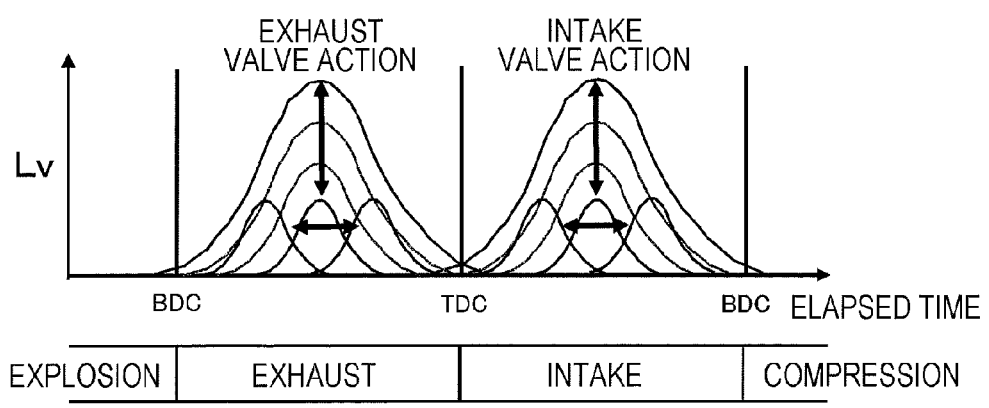
[FIG. 3] A diagram for illustrating characteristics of variable valve mechanisms of the internal combustion engine in the first embodiment.

FIG. 3 is a diagram for illustrating characteristics of the variable valve mechanisms of the internal combustion engine in the present embodiment.

The vertical axis of a graph shown in FIG. 3 indicates a valve lift amount Lv, and the horizontal axis indicates an elapsed time. BDC indicates that the piston is at a bottom dead center, TDC indicates that the piston is at a top dead center, and processes (explosion, exhaust, intake, compression) of the engine 100 corresponding to the elapsed time are shown in a lower part of the figure. An action of the exhaust valve can be performed from the exhaust and explosion processes to the intake process. A timing when an increase in the valve lift amount is started is defined as an exhaust valve open timing (hereinafter, referred to as the EVO), and a timing when the valve lift amount is reduced to become zero after that is defined as an exhaust valve close timing (hereinafter, referred to as the EVC).

In the present embodiment, the variable valve mechanisms 7 are provided in the intake valve and the exhaust valve. By altering an activation timing of the variable valve mechanisms 7, profiles of the valve lift amount (for example, a maximum valve lift amount, a timing of the maximum valve lift amount, transition of the valve lift amount, the EVO, the EVC, a phase, and the like) can be continuously or stepwise altered, and actions of the intake valve can be similarly altered.

In the present embodiment, the variable valve mechanisms for continuously or stepwise altering the profiles of the valve lift amount are provided in both the intake valve and the exhaust valve. However, the present invention is not limited to this but the variable valve mechanism may be provided only in the exhaust valve. Further, either a mechanism in which the phase is variable or a mechanism in which the valve lift amount is variable may be provided. By controlling the variable valve mechanisms 7 described above and the electronic control throttle 16, the air amount in the combustion chamber 8 and the internal EGR amount (residual gas amount) are adjusted.

Figure 4:
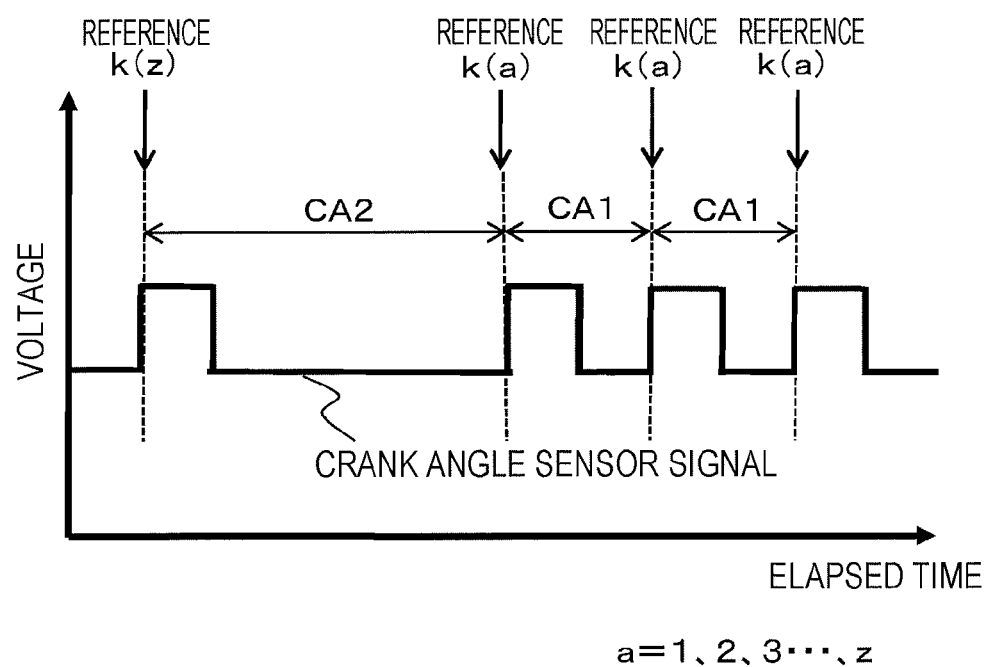
[FIG. 4] A diagram for illustrating a determination method of an output signal of a crank angle sensor and an angle of a crankshaft based on the output signal in the first embodiment.

FIG. 4 is a diagram for illustrating a determination method of the output signal of the crank angle sensor and the angle of the crankshaft based on the output signal in the present embodiment.

In the present embodiment, the output signal of the crank angle sensor 10 is a voltage of a rectangular wave. A time when the voltage of the rectangular wave is raised is defined as upstroke, and a time when the voltage is lowered is defined as downstroke. The rectangular wave is repeatedly output taking a predetermined number z as one cycle. In the ECU 1, a reference k(a) is determined for every timing of the upstroke. The index (a) is the ordinal number of the reference k in which the reference k(a) of the first upstroke of the rectangular wave after a time elapses after the z-th (z is the predetermined number) rectangular wave is output is k(1). Upon the predetermined number z, (a)=(z). The angle is determined with a rotation angle CA2 of the crankshaft 11 upon determination of the reference k(z) and the reference k(1), and with a rotation angle CA1 of the crankshaft 11 for every reference k(a) determined other than the above references. In the ECU 1, the angle of the crankshaft 11 is determined with the rotation angles CA1, CA2 of the crankshaft 11. In a case where the predetermined number z is insufficient or excessive, it is determined that the crank angle sensor 10 is abnormal.

Figure 5:
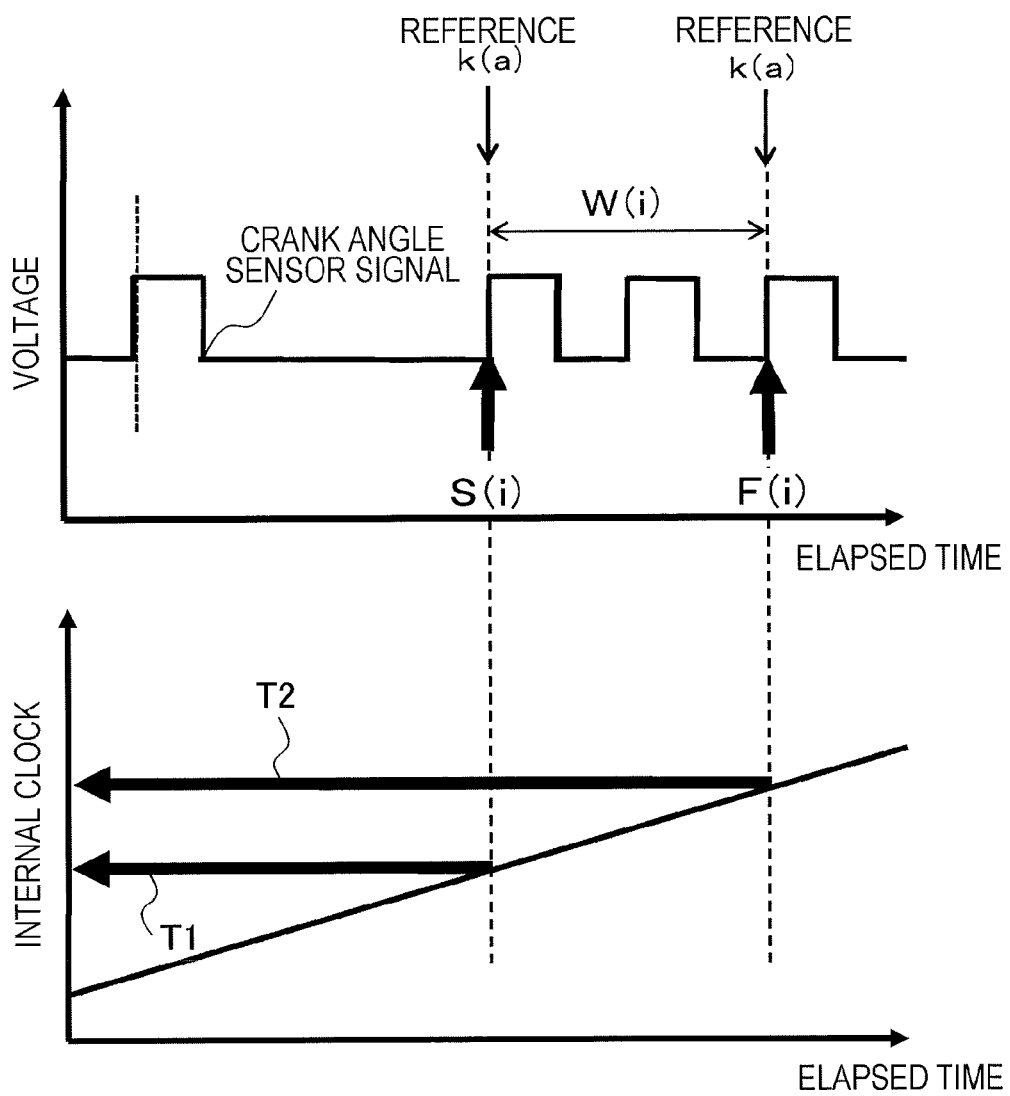
[FIG. 5] A diagram for illustrating an action of an ECU timer based on the output signal of the crank angle sensor in the first embodiment.

FIG. 5 is a diagram for illustrating an action of an ECU timer based on the output signal of the crank angle sensor in the present embodiment.

In the present embodiment, in the rectangular wave of the crank angle sensor 10 taking the predetermined number z as one cycle, a detection start timing S(i) for determining start of detection of the reference k(1) and a detection completion timing F(i) for determining completion of detection of the predetermined reference k(a) are set. An integration value of the rotation angles CA1, CA2 of the crankshaft 11 from the detection start timing S(i) to the detection completion timing F(i) is a detection rotation angle W(i) (upper part of the figure). The index (i) indicates the number of the combustion in the engine 100. The detection start timing S(i) is not limited to the reference k(1). The detection completion timing F(i) is set in the future after the detection start timing S(i) and set at the reference k(a) before the next timing S(i) is set. At the reference k(1) at the detection start timing S(i), an internal clock is activated in the ECU 1 when the engine 100 is in an operation state (lower part of the figure). That is, the ECU starts activating the internal clock of the ECU taking the reference k(1) at the detection start timing S(i) as a trigger. The ECU timer takes a clock value of the internal clock in the ECU 1 at a timing of the reference k(1) of the detection start timing S(i) as T1 and a clock value of the internal clock in the ECU 1 at a timing of the reference k(a) of the detection completion timing F(i) as T2, and performs an action of storing the clock values in the ECU 1.

Figure 6:
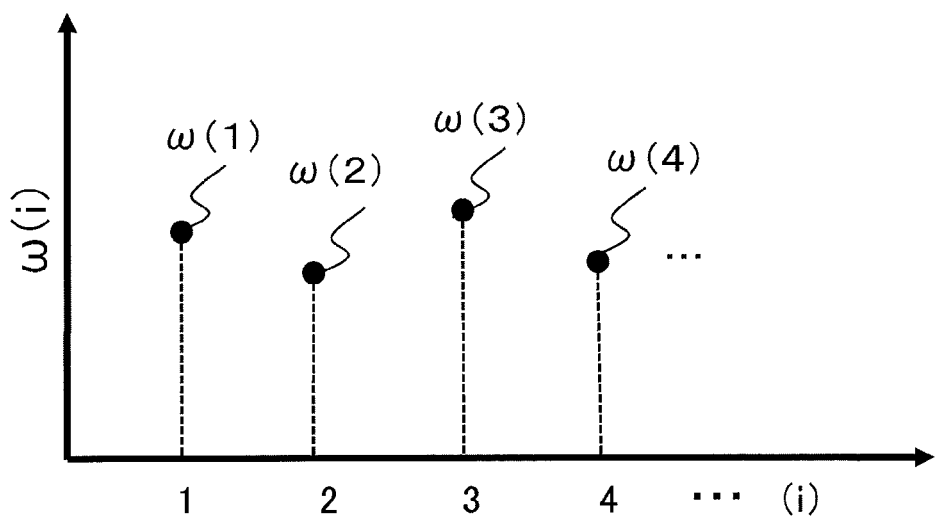
[FIG. 6] A diagram for illustrating an angular velocity of the crankshaft in the first embodiment.

FIG. 6 is a diagram for illustrating the angular velocity of the crankshaft in the present embodiment.

In the present embodiment, the angular velocity ω(i) of the crankshaft 11 is calculated from the clock values T1, T2 stored in the ECU 1 by the action of the ECU timer and the detection rotation angle W(i) by using the following expression (1).

$$\omega(i)=W(i)/(T2-T1) \quad \text{Expression (1)}$$

The index (i) indicates the number of the combustion in the engine 100. A calculation timing is the timing of the detection completion timing F(i) when it is determined that the detection of the reference k(a) is completed. In the present embodiment, the angular velocity ω(i) of the crankshaft 11 is calculated. However, a moving distance of the piston 12 acting on the same cycle as a rotation cycle of the crankshaft 11 may also be calculated.

Next, control for detecting and suppressing a combustion change when the combustion mode of the engine 100 is the spark ignited combustion will be described.

Figure 7:
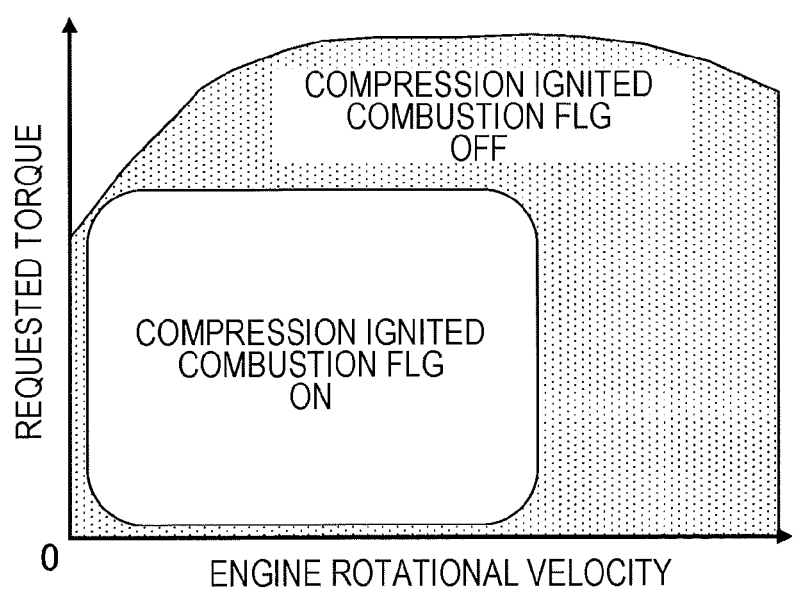
[FIG. 7] An illustrative diagram of an operation region of spark ignited combustion and compression ignited combustion and a control map of a compression ignited combustion FLG in the first embodiment.

FIG. 7 is an illustrative diagram of an operation region of the spark ignited combustion and the compression ignited combustion and a control map of a compression ignited combustion FLG in the present embodiment.

In the present embodiment, the engine 100 is operable upon switching the spark ignited combustion and the compression ignited combustion in accordance with the operation region. The ECU 1 is provided with the control map of the compression ignited combustion FLG based on the requested torque calculated from the output signal of the accelerator opening sensor 2 and the rotational velocity of the engine 100 calculated from the output signal of the crank angle sensor 10. By referring to the control map based on the requested torque and the engine rotational velocity, the compression ignited combustion FLG is switched to be ON and OFF. That is, the compression ignited combustion FLG is switched to be ON and OFF in accordance with the combustion mode. The control map of the compression ignited combustion FLG is not limited to this but the engine may be provided with a control map calculated from any of the requested torque and the engine rotational velocity.

Figure 8:
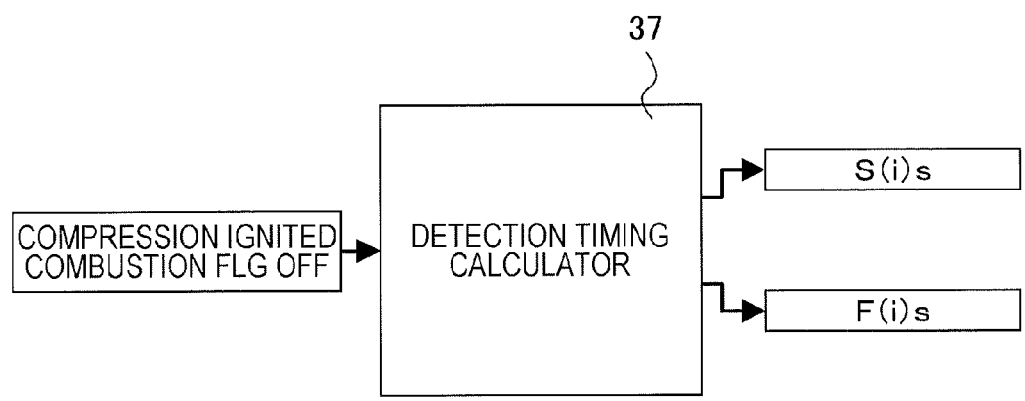
[FIG. 8] A block diagram for illustrating a method for calculating a detection start timing and a detection completion timing when the compression ignited combustion FLG is turned OFF in the first embodiment.

FIG. 8 is a block diagram for illustrating a method for calculating the detection start timing and the detection completion timing when the compression ignited combustion FLG is turned OFF in the present embodiment.

The ECU 1 is provided with a detection timing calculator 37 for calculating and outputting the detection start timing S(i) and the detection completion timing F(i) based on the compression ignited combustion FLG as an internal function thereof. The detection timing calculator calculates a detection start timing S(i)s and a detection completion timing F(i)s when the compression ignited combustion FLG is turned OFF. The index s indicates that the compression ignited combustion FLG is turned OFF, that is, the combustion mode is the spark ignited combustion. Desirably, when the compression ignited combustion FLG is turned OFF, the detection completion timing F(i)s is a later timing than a time when the compression ignited combustion FLG is turned ON, so as to correspond to the spark ignited combustion in which the combustion continues for a longer duration than the compression ignited combustion. Desirably, the detection start timing S(i)s and the detection completion timing F(i)s are set at the same reference k(a). That is, at the time of the spark ignited combustion, the detection start timing S(i)s is set at a compression top dead center TDC: 0 deg. ATDC CA, and the detection completion timing F(i)s is set at a compression top dead center TDC of the next combustion cylinder. Thereby, the actual timings for detection start and completion are only TDC, and the detection of the next combustion cylinder is started and the detection of the current combustion cylinder is completed at the same time.

Figure 9:
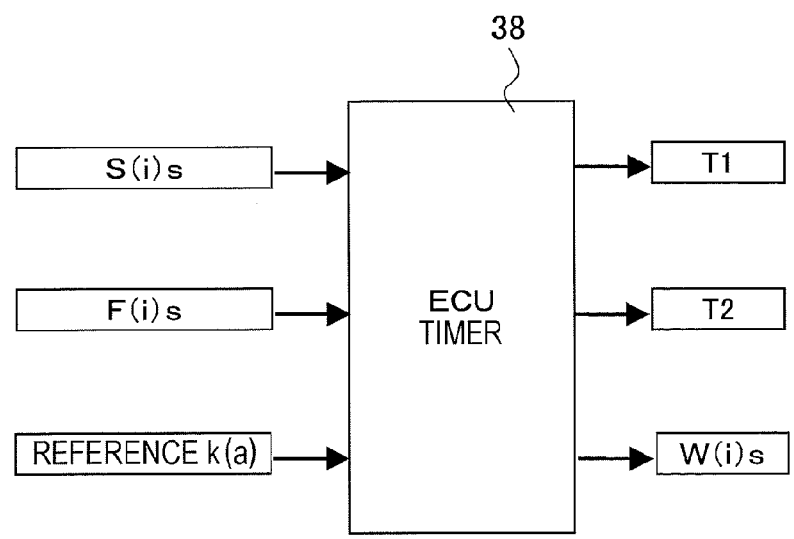
[FIG. 9] A block diagram for illustrating an action of the ECU timer based on the output signal of the crank angle sensor when the compression ignited combustion FLG is turned OFF in the first embodiment.

FIG. 9 is a block diagram for illustrating the action of the ECU timer based on the output signal of the crank angle sensor when the compression ignited combustion FLG is turned OFF in the present embodiment.

Based on inputs of the detection start timing S(i)s, the detection completion timing F(i)s, and the reference k(a) determined from the output signal of the crank angle sensor 11, the ECU timer 38 outputs the clock values T1, T2 of the internal clock of the ECU 1 when the references k(a) corresponding to the detection start timing S(i)s and the detection completion timing F(i)s are respectively input, and also outputs a detection rotation angle W(i)s.

Figure 10:
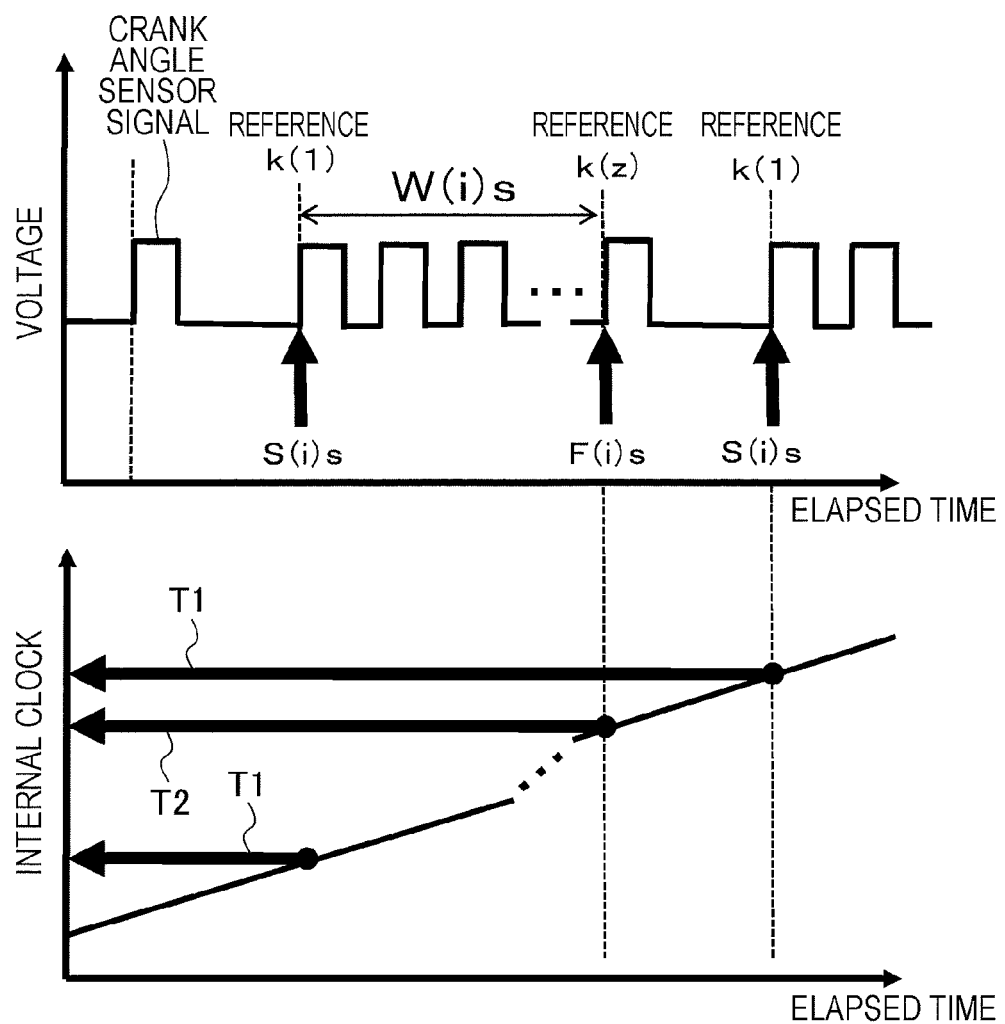
[FIG. 10] A diagram for illustrating the action of the ECU timer based on the output signal of the crank angle sensor when the compression ignited combustion FLG is turned OFF in the first embodiment.

FIG. 10 is a diagram for illustrating the action of the ECU timer based on the output signal of the crank angle sensor when the compression ignited combustion FLG is turned OFF.

The ECU timer 38 is activated based on the inputs of the detection start timing S(i)s, the detection completion timing F(i)s, and the references k(a) determined from the output signal of the crank angle sensor 11 when the compression ignited combustion FLG is turned OFF. That is, the clock values of the internal clock in the ECU 1 at timings when the references k(a) become the detection start timing S(i)s and the detection completion timing F(i)s are respectively stored as T1, T2. It should be noted that although the detection start timing S(i)s is the reference k(1) and the detection completion timing F(i)s is the reference k(z) in the present embodiment, the present invention is not limited to this and the detection start timing S(i)s is not limited to the reference k(1). The detection completion timing F(i)s is set in the future after the detection start timing S(i)s and set at the reference before the next detection start timing S(i)s. Desirably, the detection completion timing F(i)s is set at the same reference k(a) as the detection start timing S(i)s. A detection duration at the time of the spark ignited combustion may be desirably set from the compression top dead center TDC of the cylinder to be detected to the compression top dead center TDC of the next combustion cylinder as shown above, so that the detection start and completion timings are overlapped with each other.

The detection rotation angle W(i)s serving as an integration value of the rotation angles CA1, CA2 of the crankshaft 11 determined from the number of the reference k(a) from the detection start timing S(i)s to the detection completion timing F(i)s is calculated.

Figure 11:
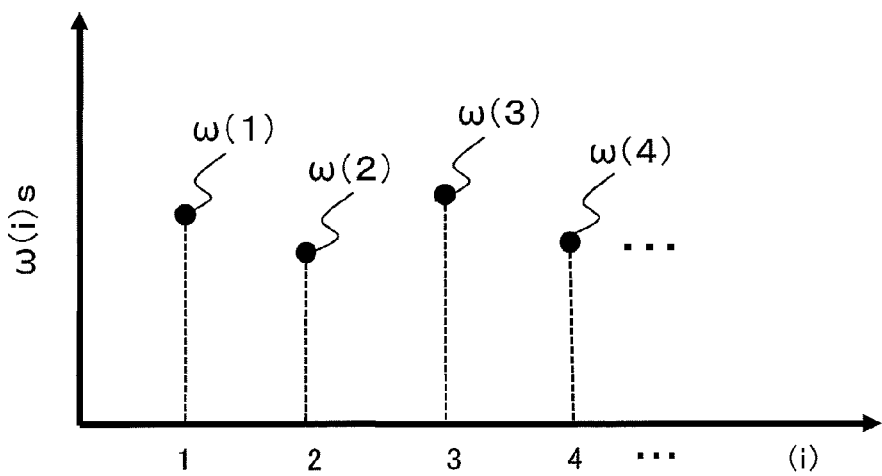
[FIG. 11] A diagram for illustrating the angular velocity of the crankshaft when the compression ignited combustion FLG is turned OFF in the first embodiment.

FIG. 11 is a diagram for illustrating the angular velocity of the crankshaft when the compression ignited combustion FLG is turned OFF in the present embodiment.

An angular velocity ω(i)s of the crankshaft 11 when the compression ignited combustion FLG is turned OFF is calculated from the clock values T1, T2 stored in the ECU 1 by activating the ECU timer 38 and the detection rotation angle W(i)s by using the above expression (1). A calculation timing is the timing of the detection completion timing F(i)s when it is determined that the detection of the reference k(a) is completed. The angular velocity ω(i)s of the crankshaft 11 is calculated for every time when the combustion is performed.

Figure 12:
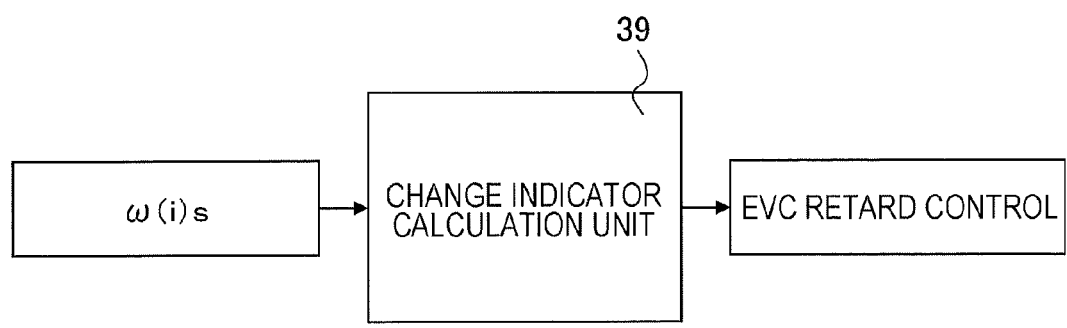
[FIG. 12] A control block diagram for illustrating a control method for suppressing a combustion change when the compression ignited combustion FLG is turned OFF in the first embodiment.

FIG. 12 is a control block diagram for illustrating a control method for suppressing the combustion change when the compression ignited combustion FLG is turned OFF in the present embodiment.

In the present embodiment, EVC retard control for retarding the EVC is performed as the control for suppressing the combustion change when the compression ignited combustion FLG is turned OFF. The ECU 1 has a change indicator calculation unit 39 for calculating a change indicator indicating a degree of the combustion change as an internal configuration thereof. The change indicator calculation unit 39 calculates a change indicator C based on the angular velocity ω(i)s of the crankshaft 11 when the compression ignited combustion FLG is turned OFF, an adjacent difference angular velocity of the adjacent combustion numbers (i) calculated in accordance with an expression (2), or a relevant cylinder difference angular velocity of integral multiples of cylinder numbers of the engine 100 calculated in accordance with an expression (3).

Adjacent difference angular velocity=angular velocity ω(i+1)−ω(i)　　　Expression (2)

Relevant cylinder difference angular velocity=angular velocity ω(2i)−ω(i)　　　Expression (3)

The change indicator calculation unit 39 can calculate, for example, a standard deviation indicating a variation degree of the angular velocity ω(i)s and the like as the change indicator C. The change indicator C calculated by the change indicator calculation unit 39 is used for determining whether or not the EVC retard control is performed.

Figure 13:
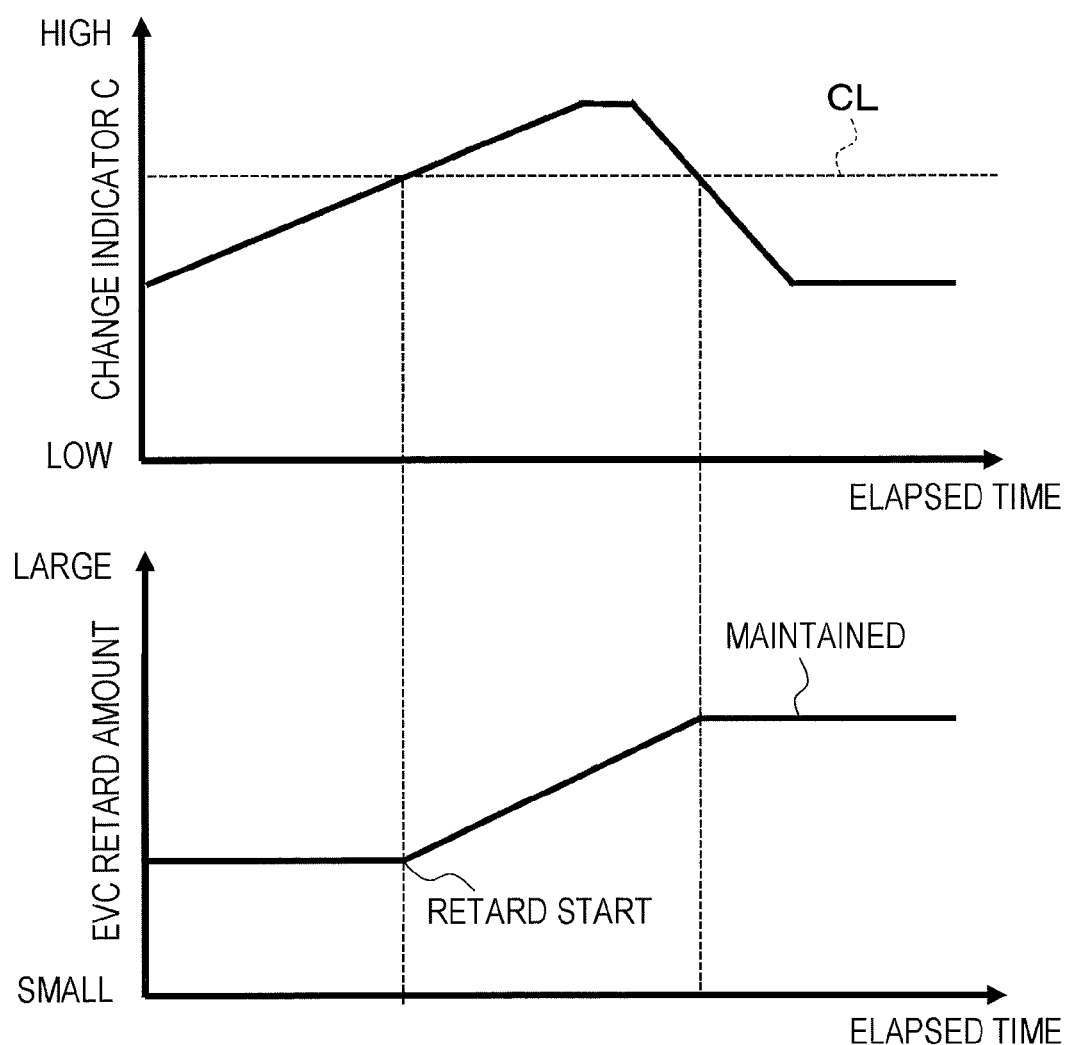
[FIG. 13] A diagram for illustrating contents of combustion change suppression control when the compression ignited combustion FLG is turned OFF in the first embodiment.

FIG. 13 is a diagram for illustrating contents of the combustion change suppression control when the compression ignited combustion FLG is turned OFF in the present embodiment.

The ECU 1 compares the change indicator C calculated by the change indicator calculation unit 39 and a predetermined threshold value CL, and starts the EVC retard control for gradually increasing an EVC retard amount when the change indicator C becomes the threshold value CL or more (retard start).

By such EVC retard control, in accordance with an increase in the EVC retard amount, the internal EGR amount in the combustion chamber is reduced. Therefore, the combustion is stabilized, the combustion change is decreased, and the change indicator C is no more increased but lowered. By maintaining the EVC retard amount when the change indicator C becomes less than the threshold value CL again, the combustion change can be suppressed.

Next, control for detecting and suppressing the combustion change when the combustion mode of the engine 100 is the compression ignited combustion will be described.

Figure 14:
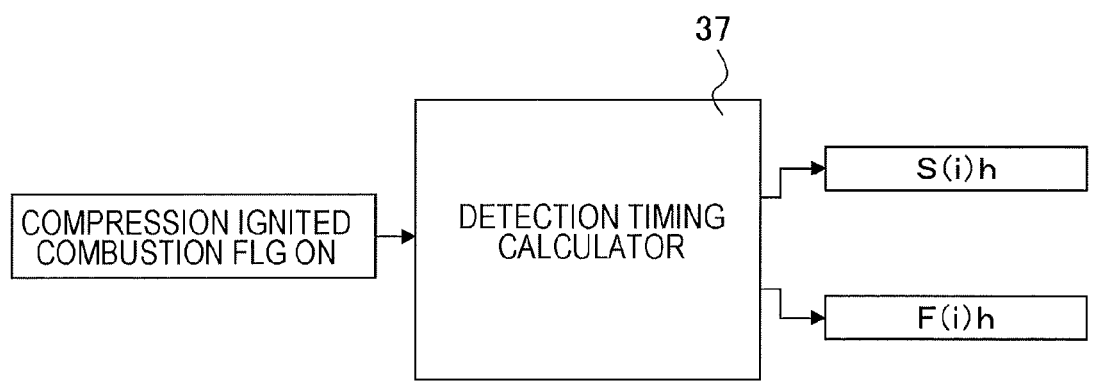
[FIG. 14] A block diagram for illustrating a method for calculating a detection start timing and a detection completion timing when the compression ignited combustion FLG is turned ON in the first embodiment.

FIG. 14 is a block diagram for illustrating a method for calculating a detection start timing and a detection completion timing when the compression ignited combustion FLG is turned ON in the present embodiment.

In a case where the combustion mode is the compression ignited combustion, the detection timing calculator 37 calculates the detection timing so that the detection duration is shortened and the detection time is advanced more than the spark ignited combustion to include a peak time of the combustion pressure in the combustion chamber of the engine 100.

For example, the combustion pressure peak time ranges from 15 degrees to 25 degrees after the compression top dead center TDC (15 to 25 deg. ATDC CA) in the spark ignited combustion, and ranges from the compression top dead center TDC to 15 degrees (0 (TDC) to 15 deg. ATDC CA) in the compression ignited combustion. Meanwhile, the detection duration and the detection time are for example calculated to be from the compression top dead center TDC of the combustion cylinder to be detected to the compression top dead center TDC of the next combustion cylinder in the spark ignited combustion, and calculated to be from the compression top dead center TDC of the combustion cylinder to be detected to 40 crank angle after the TDC in the compression ignited combustion.

Specifically, the detection timing calculator 37 calculates a detection start timing S(i)h and a detection completion timing F(i)h when the compression ignited combustion FLG is turned ON. The index h indicates that the compression ignited combustion FLG is turned ON. Desirably, when the compression ignited combustion FLG is turned ON, the detection start timing S(i)h is a later timing than the detection start timing S(i)s when the compression ignited combustion FLG is turned OFF and the detection completion timing F(i)h is an earlier timing than the detection completion timing F(i)s when the compression ignited combustion FLG is turned OFF, so as to correspond to the compression ignited combustion in which the combustion continues for a shorter duration than the spark ignited combustion. Desirably, the detection start timing S(i)h is set at the reference k(a) when the piston 12 is at the TDC position.

Figure 15:
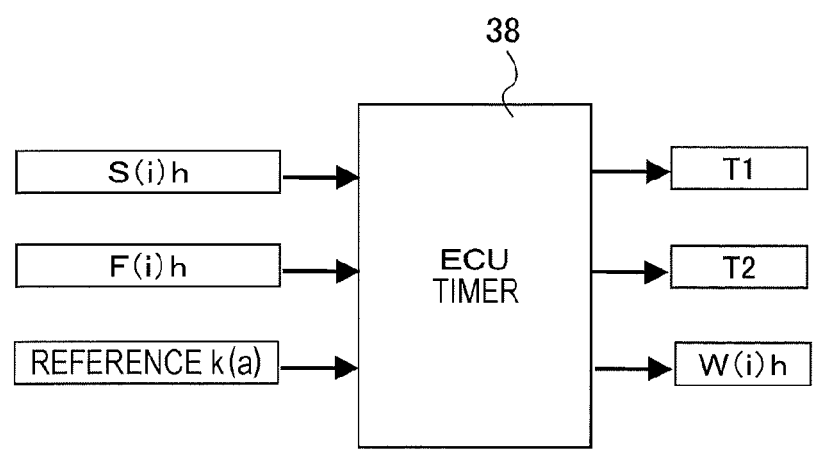
[FIG. 15] A block diagram for illustrating processing contents of the ECU timer in the first embodiment.

FIG. 15 is a block diagram for illustrating processing contents of the ECU timer in the present embodiment.

Based on inputs of the detection start timing S(i)h, the detection completion timing F(i)h, and the references k(a) determined from the output signal of the crank angle sensor 11, the ECU timer 38 outputs the clock values T1, T2 of the internal clock of the ECU 1 when the references k(a) corresponding to the detection start timing S(i)h and the detection completion timing F(i)h are respectively input, and also outputs a detection rotation angle W(i)h.

Figure 16:
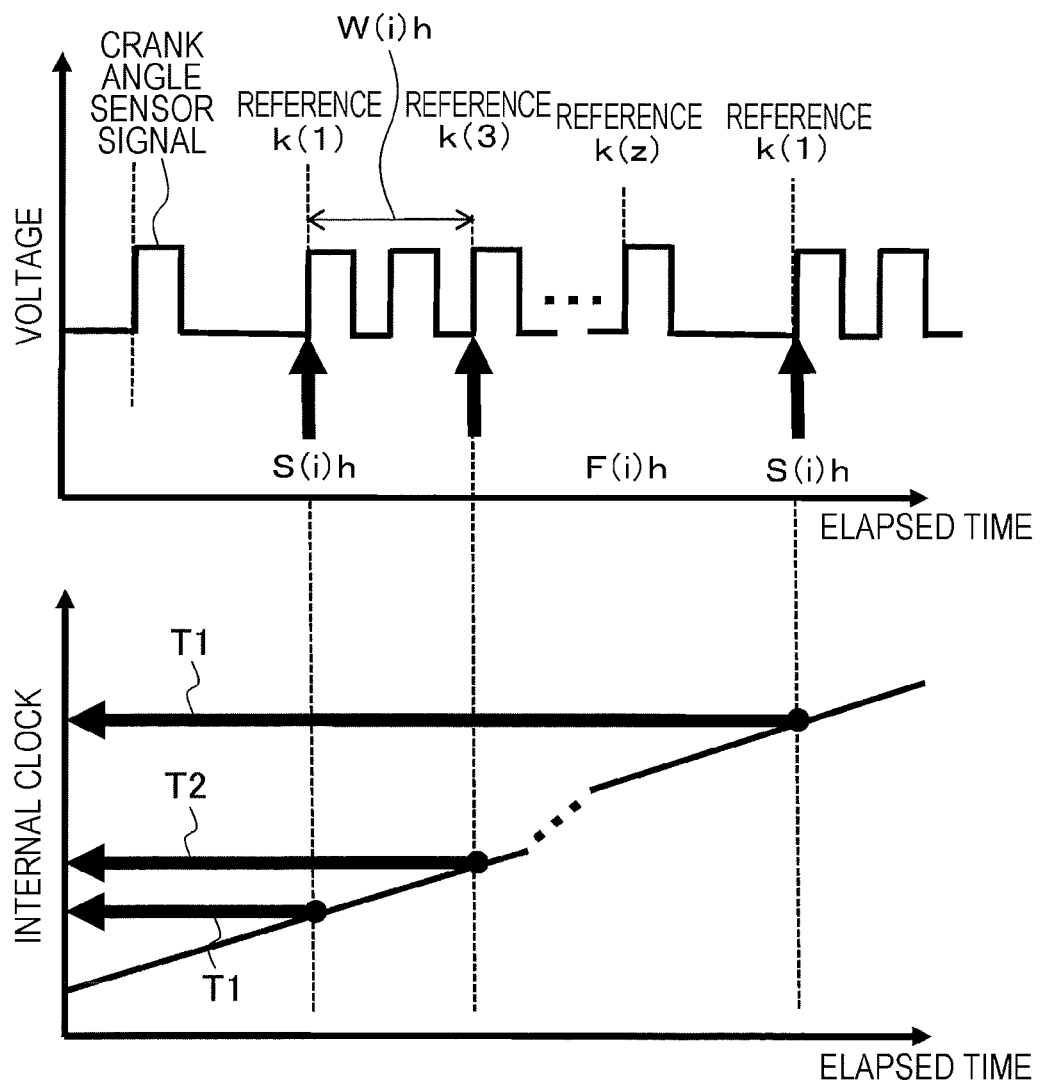
[FIG. 16] A diagram for illustrating an action of the ECU timer based on the output signal of the crank angle sensor when the compression ignited combustion FLG is turned ON in the first embodiment.

FIG. 16 is a diagram for illustrating an action of the ECU timer based on the output signal of the crank angle sensor when the compression ignited combustion FLG is turned ON in the present embodiment.

The ECU timer 38 is activated based on the inputs of the detection start timing S(i)h, the detection completion timing F(i)h, and the references k(a) determined from the output signal of the crank angle sensor 11 when the compression ignited combustion FLG is turned ON. That is, the clock values of the internal clock in the ECU 1 at timings when the references k(a) become the detection completion timing S(i)h and the detection completion timing F(i)h are respectively stored as T1, T2. It should be noted that although the detection completion timing S(i)h is the reference k(1) and the detection completion timing F(i)h is a reference k(3) in the present embodiment, the present invention is not limited to this, the detection start timing S(i)h is not limited to the reference k(1), and the detection completion timing F(i)h is not limited to the reference k(3). The detection completion timing F(i)h is set in the future after the detection start timing S(i)h and set at the reference before the next detection start timing S(i)h.

The detection rotation angle W(i)h serving as an integration value of the rotation angles CA1, CA2 of the crankshaft 11 determined from the number of the reference k(a) from the detection start timing S(i)h to the detection completion timing F(i)h is calculated. In a case where the predetermined number z is insufficient or excessive, it is determined that the crank angle sensor is abnormal, and the compression ignited combustion can be cancelled.

Figure 17:
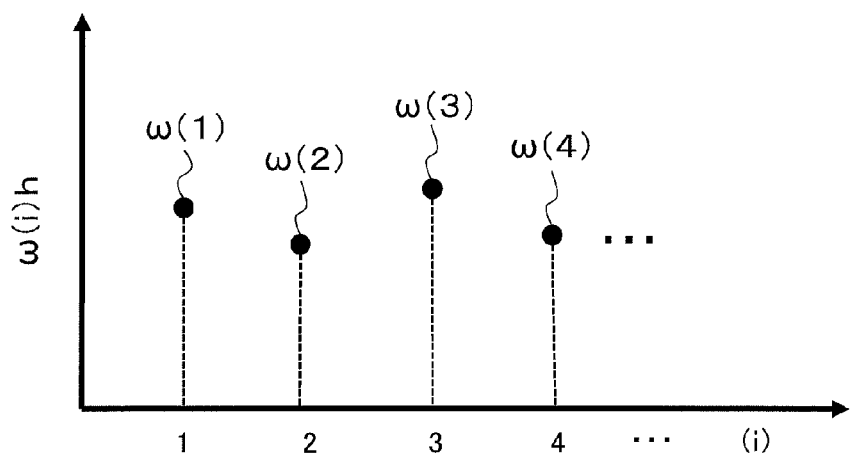
[FIG. 17] A diagram for illustrating the angular velocity of the crankshaft when the compression ignited combustion FLG is turned ON in the first embodiment.

FIG. 17 is a diagram for illustrating the angular velocity of the crankshaft when the compression ignited combustion FLG is turned ON in the present embodiment.

An angular velocity $\omega(i)h$ of the crankshaft 11 when the compression ignited combustion FLG is turned ON is calculated from the clock values T1, T2 stored in the ECU 1 by activating the ECU timer 38 and the above detection rotation angle W(i)h by using the above expression (1). A calculation timing is the timing of the detection completion timing F(i)h when it is determined that the detection of the reference k(a) is completed. The angular velocity $\omega(i)h$ of the crankshaft 11 is calculated for every time when the combustion is performed.

Figure 18:
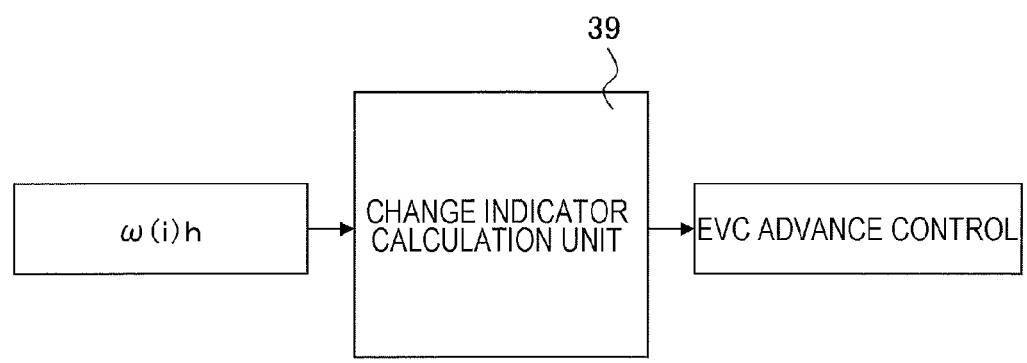
[FIG. 18] A diagram for illustrating a method for calculating a change indicator when the compression ignited combustion FLG is turned ON in the first embodiment.

FIG. 18 is a control block diagram for illustrating a control method for suppressing the combustion change when the compression ignited combustion FLG is turned ON in the present embodiment.

In the present embodiment, EVC advance control for advancing the EVC is performed as the control for suppressing the combustion change when the compression ignited combustion FLG is turned ON. The change indicator calculation unit 39 calculates the change indicator C based on the angular velocity $\omega(i)h$ of the crankshaft 11 when the compression ignited combustion FLG is turned ON, the adjacent difference angular velocity of the above expression (2), or the relevant cylinder difference angular velocity of the above expression (3).

Figure 19:
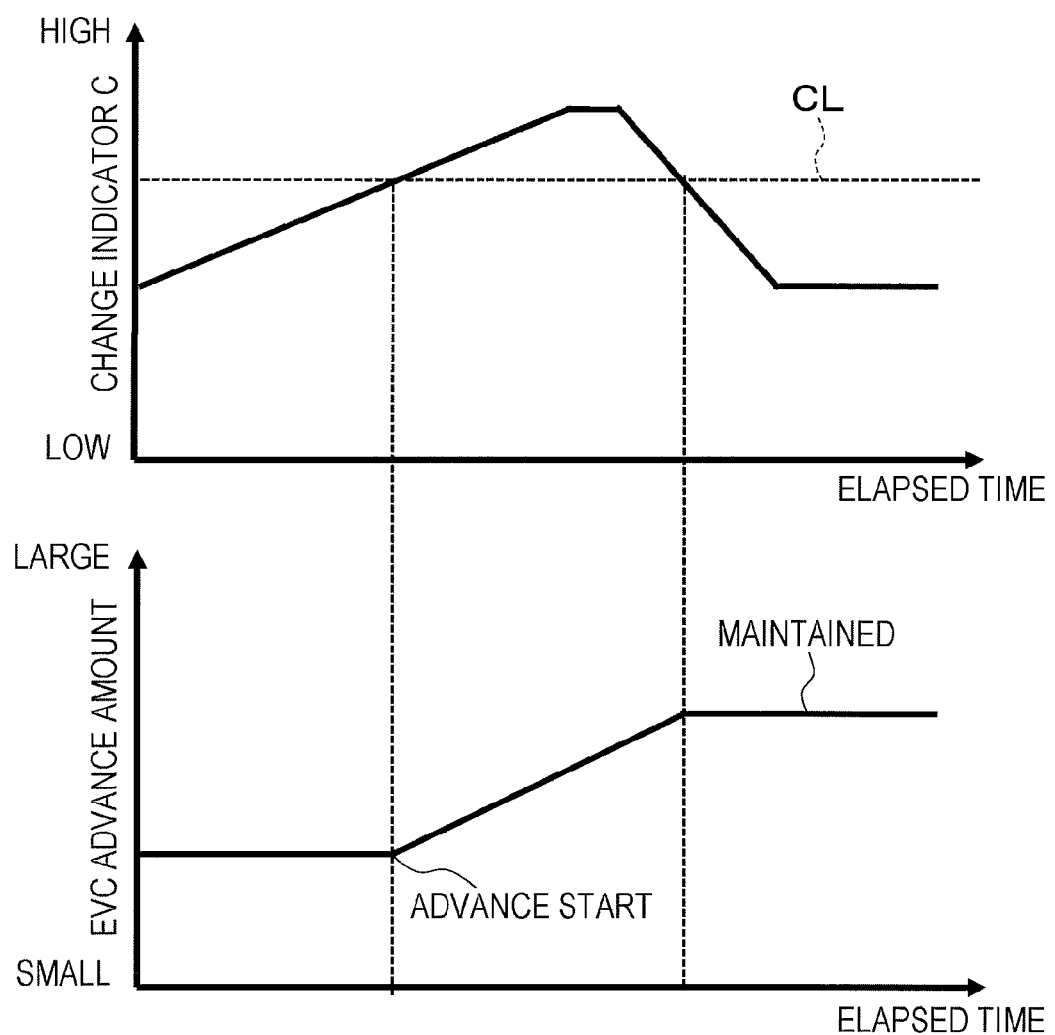
[FIG. 19] A diagram for illustrating contents of the combustion change suppression control when the compression ignited combustion FLG is turned ON in the first embodiment.

FIG. 19 is a diagram for illustrating contents of the combustion change suppression control when the compression ignited combustion FLG is turned ON in the present embodiment.

The ECU 1 compares the change indicator C calculated by the change indicator calculation unit 39 and the predetermined threshold value CL, and starts the EVC advance control for gradually increasing an EVC advance amount when the change indicator C becomes the threshold value CL or more (advance start).

By such EVC advance control, in accordance with an increase in the EVC advance amount, the internal EGR amount in the combustion chamber is increased. Therefore, the combustion is stabilized, the combustion change is decreased, and the change indicator C is no more increased but lowered. By maintaining the EVC advance amount when the change indicator C becomes less than the threshold value CL again, the combustion change can be suppressed. In the present embodiment, the EVC advance amount when the change indicator C becomes less than the predetermined value CL is maintained. However, the EVC advance amount when the change indicator gets smaller than the predetermined value CL may be maintained.

When the combustion change is generated in the compression ignited combustion, the combustion change can be suppressed by performing the EVC advance control. This is because failure of self-ignition is generated in a state that the combustion change is large in the compression ignited combustion and in order to suppress this, leaving a high-temperature exhaust gas for facilitating the self-ignition in the combustion chamber is effective. The increase in the EVC advance amount in the present control can efficiently increase a leaving amount of the high-temperature exhaust gas, and also steadily suppress the combustion change by maintaining the leaving amount.

Figure 20:
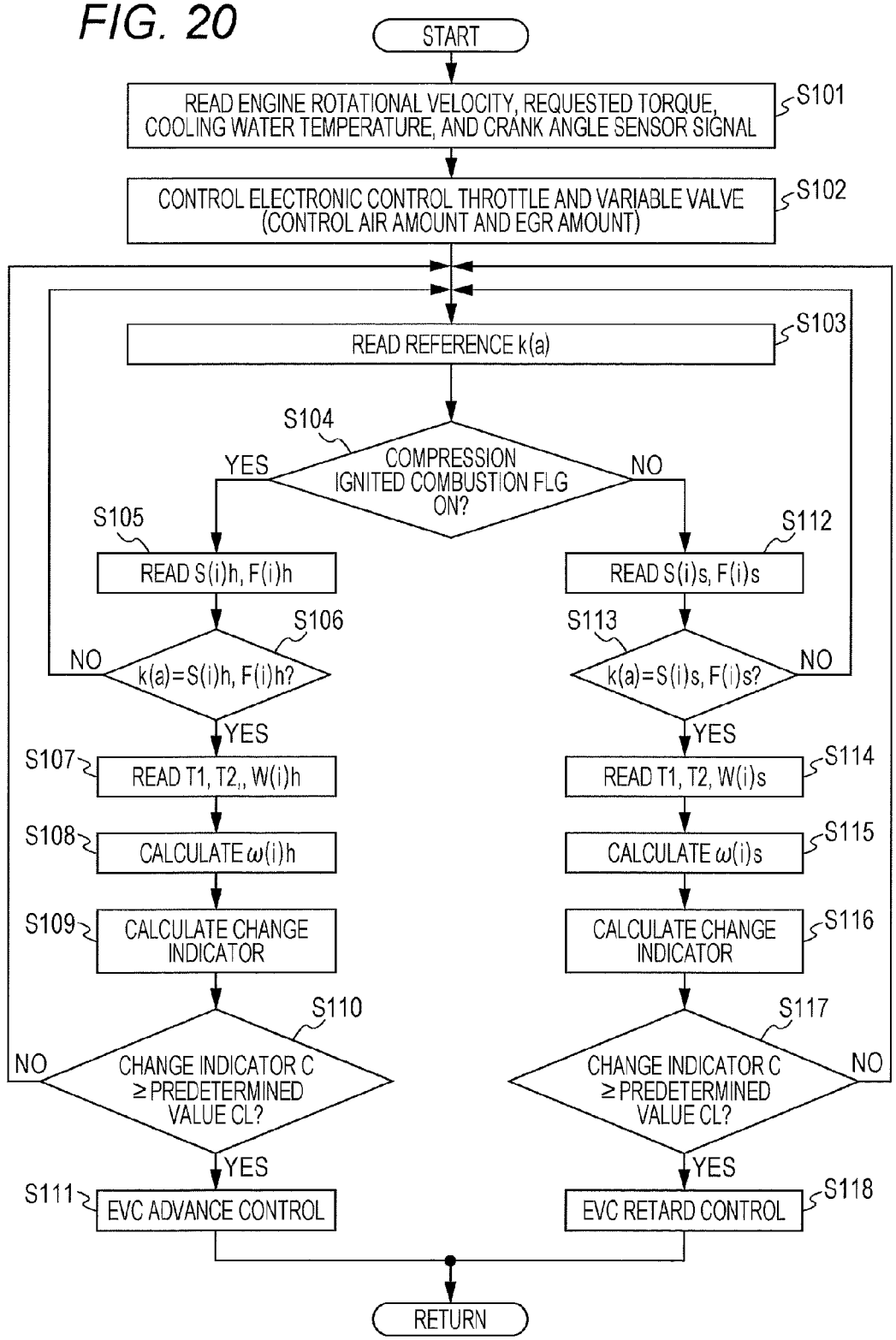
[FIG. 20] A flowchart for illustrating control contents of the combustion change suppression control in the first embodiment.

FIG. 20 is a flowchart for illustrating control contents in the present embodiment.

The control contents shown in FIG. 20 are repeatedly executed by the ECU 1 on a predetermined cycle. In Step S101, the ECU 1 reads information on the current engine operation region (such as the engine rotational velocity, the requested engine torque, the cooling water temperature, and the crank angle sensor signal). The requested engine torque is calculated based on the output signal of the accelerator opening sensor 2.

Next, in Step S102, the electronic control throttle 16 and the variable valve mechanisms 7 are controlled so as to realize a proper suctioned air amount based on the current engine operation region. In Step S103, the reference k(a) is read by using the crank angle sensor signal read in Step S101.

In Step S104, by using the engine rotational velocity, the requested engine torque, and the like read in Step S101, it is determined whether or not the current operation region is a compression ignited combustion region from a preliminarily stored map or the like, and the compression ignited combustion FLG is switched ON or OFF.

In a case where the compression ignited combustion FLG is turned ON (YES in Step S104), in Step S105, the detection start timing S(i)h and the detection completion timing F(i)h set for the compression ignited combustion are read.

In Step S106, it is determined whether or not the reference k(a) read in Step S103 is equal to the detection start timing S(i)h and the detection completion timing F(i)h.

In a case where the reference k(a) is not equal to the detection start timing S(i)h and the detection completion timing F(i)h (NO in Step S106), the proceeding is returned to Step S103 and the reference k(a) is read again.

Meanwhile, In a case where the reference k(a) read in Step S103 is equal to the detection start timing S(i)h and the detection completion timing F(i)h, in Step S107, the clock values T1, T2 of the internal clock of the ECU 1 at the references k(a) corresponding to the detection start timing S(i)h and the detection completion timing F(i)h and the detection rotation angle W(i)h are read. In Step S108, by using the clock values T1, T2 and the detection rotation angle W(i)h, the angular velocity $\omega(i)h$ of the crankshaft 11 is calculated. Then, in Step S109, the change indicator C of the angular velocity $\omega(i)h$ calculated in Step S108 is calculated. A standard deviation of the angular velocity $\omega(i)h$ of the crankshaft 11, an average deviation, and the like can be used for the change indicator C.

Next, in Step S110, it is determined whether or not the change indicator C is the threshold value CL or more. In a case where the change indicator C is not the threshold value CL or more, that is, the change indicator C is less than the threshold value CL (NO in Step S110), the proceeding is returned to Step S103 and the reference k(a) is read again. In a case where it is determined that the change indicator C is the threshold value CL or more (YES in Step S110), the proceeding is moved to Step S111, the EVC advance control for increasing the EVC advance amount is performed, and then the control of the present flow is finished.

Meanwhile, in a case where it is determined that the compression ignited combustion FLG is turned OFF (NO in Step S104), in Step S112, the detection start timing S(i)s and the detection completion timing F(i)s set for the spark ignited ignition are read. In Step S113, it is determined whether or not the reference k(a) read in Step S103 is equal to the detection start timing S(i)s and the detection completion timing F(i)s.

In a case where the reference k(a) is not equal to the detection start timing S(i)s and the detection completion timing F(i)s (NO in Step S113), the proceeding is returned to Step S103 and the reference k(a) is read again.

Meanwhile, in a case where the reference k(a) read in Step S103 is equal to the detection start timing S(i)s and the detection completion timing F(i)s, in Step S114, the clock values T1, T2 of the internal clock of the ECU 1 at the references k(a) corresponding to the detection start timing S(i)s and the detection completion timing F(i)s and the detection rotation angle W(i)s are read. In Step S115, by using the clock values T1, T2 and the detection rotation angle W(i)s, the angular velocity ω(i)s of the crankshaft 11 is calculated. Then, in Step S116, the change indicator C of the angular velocity ω(i)s calculated in Step S115 is calculated. A standard deviation of the angular velocity ω(i)s of the crankshaft 11, an average deviation, and the like can be used for the change indicator C.

Next, in Step S117, it is determined whether or not the change indicator C is the threshold value CL or more. In a case where the change indicator C is not the threshold value CL or more, that is, the change indicator C is less than the threshold value CL (NO in Step S117), the proceeding is returned to Step S103 and the reference k(a) is read again. In a case where it is determined that the change indicator C is the threshold value CL or more (YES in Step S117), the proceeding is moved to Step S118, the EVC retard control for increasing the EVC retard amount is performed, and then the control of the present flow is finished.

According to the engine 100 of the present embodiment, the angular velocity of the crankshaft 11 is detected at the detection time and for the detection duration set in accordance with the combustion modes of the spark ignited combustion and the compression ignited combustion, and combustion stability is determined based on the detected angular velocity of the crankshaft 11. Thus, the combustion change in the combustion modes can be accurately detected. By performing the EVC advance control and the EVC retard control based on the detected combustion change and altering the activation timing of the variable valve mechanisms 7, the combustion change is suppressed, so that the combustion stability of the internal combustion engine can be improved.

[Second Embodiment]

Next, a second embodiment will be described below.

Figure 21:
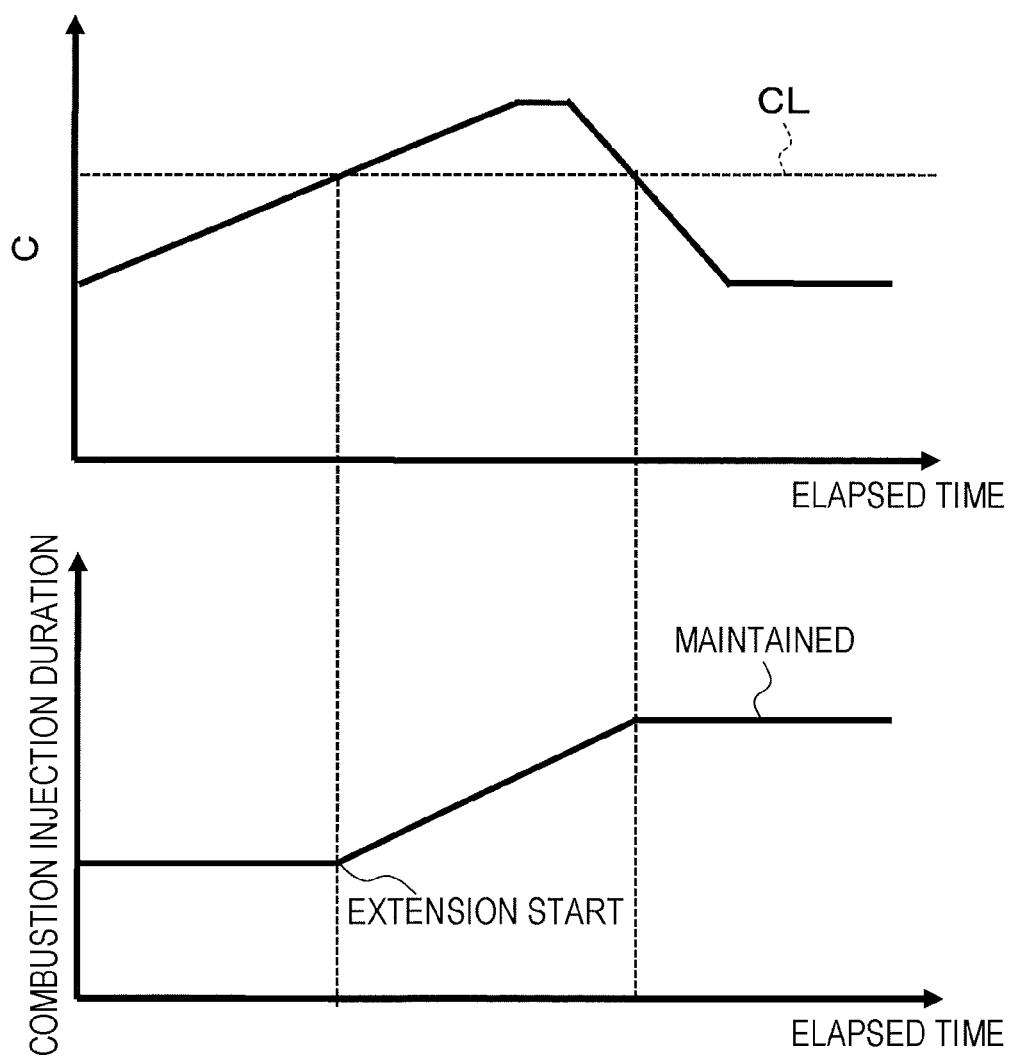
[FIG. 21] A diagram for illustrating contents of combustion change suppression control when the compression ignited combustion FLG is turned ON in a second embodiment.

FIG. 21 is a diagram for illustrating contents of combustion change suppression control when the compression ignited combustion FLG is turned ON in the present embodiment. It should be noted that since the same constituent elements as the first embodiment are given the same reference signs, detailed description thereof will be omitted.

In the present embodiment, control for extending a fuel injection duration to enrich the air-fuel mixture is performed as the control for suppressing the combustion change when the compression ignited combustion FLG is turned ON. The ECU 1 compares the change indicator C calculated by the change indicator calculation unit 39 and the threshold value CL, and starts the fuel injection duration extension control for gradually extending the fuel injection duration when the change indicator C becomes the threshold value CL or more (extension start).

By such fuel injection duration extension control, in accordance with extension of the fuel injection duration, a fuel injection amount of injection from the injector 13 is increased, so that the air-fuel mixture is enriched. Therefore, the combustion is stabilized, the combustion change is decreased, and the change indicator C is no more increased but lowered.

By maintaining the fuel injection duration when the change indicator C becomes less than the threshold value CL again, the combustion change can be suppressed. In the present embodiment, the fuel injection duration when the change indicator C becomes less than the predetermined threshold value CL is maintained. However, the fuel injection duration when the change indicator gets smaller than the threshold value CL may be maintained.

By performing the fuel injection duration extension control when the combustion change is generated in the compression ignited combustion, the combustion change can be suppressed. This is because failure of self-ignition is generated in a state that the combustion change is large in the compression ignited combustion and in order to suppress this, an increase in concentration of a firelighter for facilitating the self-ignition is effective. Extension of the fuel injection duration in the present control can efficiently increase the concentration of the firelighter, and also steadily suppress the combustion change by maintaining the fuel injection duration.

The example of the fuel injection duration extension control is described as the fuel change suppression control at the time of the compression ignited combustion in the present embodiment. However, when the concentration of the firelighter can be increased as described above, the combustion change can be suppressed. Thus, for example, a fuel injection pressure may be boosted so as to increase the fuel injection amount of the injection from the injector 13.

[Third Embodiment]

Next, a third embodiment will be described below.

Figure 22:
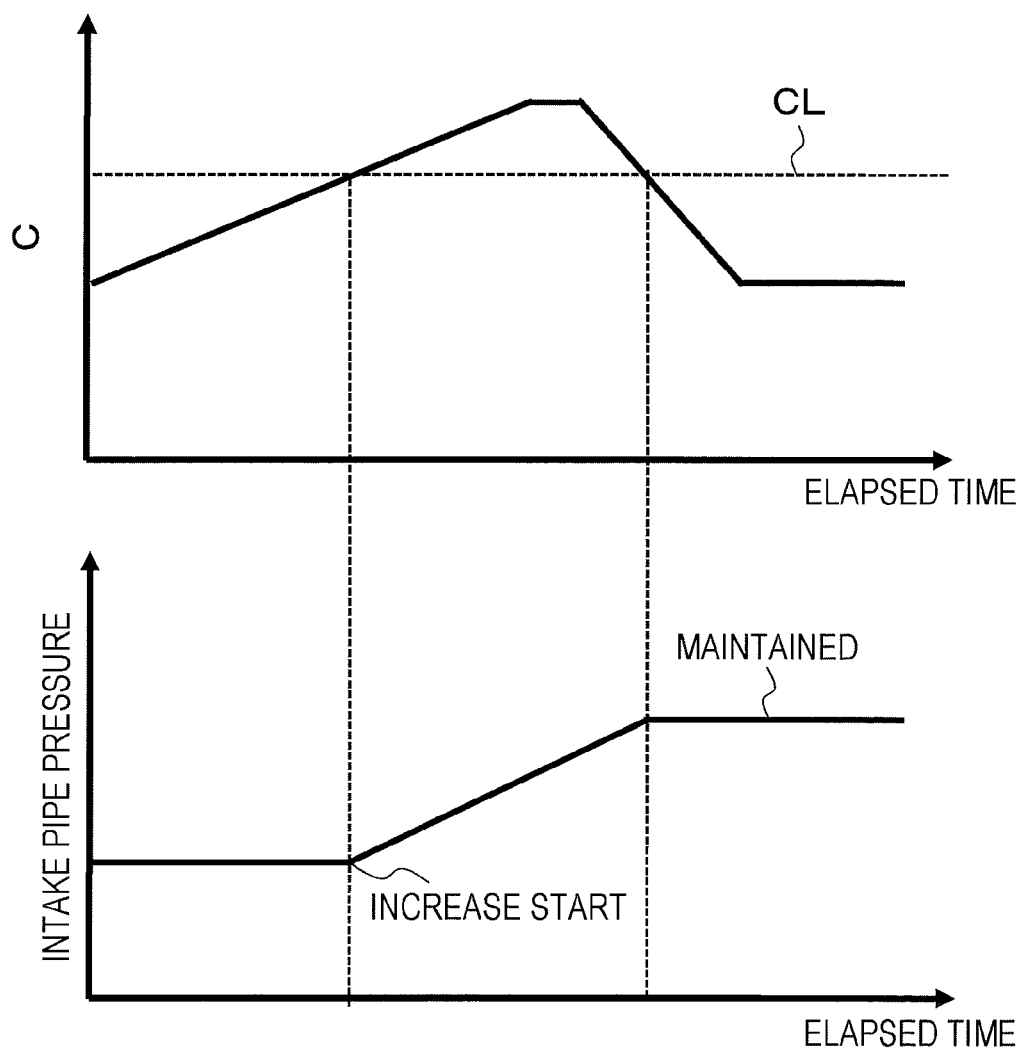
[FIG. 22] A diagram for illustrating contents of combustion change suppression control when the compression ignited combustion FLG is turned ON in a third embodiment.

FIG. 22 is a diagram for illustrating contents of combustion change suppression control when the compression ignited combustion FLG is turned ON in the present embodiment. It should be noted that since the same constituent elements as the above embodiments are given the same reference signs, detailed description thereof will be omitted.

In the present embodiment, control for increasing an intake pipe pressure to improve a temperature of the air-fuel mixture is performed as the control for suppressing the combustion change when the compression ignited combustion FLG is turned ON. The ECU 1 compares the change indicator C calculated by the change indicator calculation unit 39 and the threshold value CL, and starts the intake pipe pressure increase control for gradually increasing the intake pipe pressure when the change indicator C becomes the threshold value CL or more (increase start).

By such intake pipe pressure increase control, in accordance with an increase in the intake pipe pressure, the temperature of the air-fuel mixture supplied into the combustion chamber is increased. Therefore, the combustion is stabilized, the combustion change is decreased, and the change indicator C is no more increased but lowered.

By maintaining the intake pipe pressure when the change indicator C becomes less than the threshold value CL again, the combustion change can be suppressed. In the present embodiment, the intake pipe pressure when the change indicator C becomes less than the predetermined threshold value CL is maintained. However, the intake pipe pressure when the change indicator gets smaller than the threshold value CL may be maintained.

By performing the intake pipe pressure increase control when the combustion change is generated in the compression ignited combustion, the combustion change can be suppressed. This is because failure of self-ignition is generated in a state that the combustion change is large in the compression ignited combustion and in order to suppress this, an increase in the temperature in the combustion chamber for facilitating the self-ignition is effective. The increase in the intake pipe pressure in the present control can efficiently increase the temperature in the combustion chamber, and also steadily suppress the combustion change by maintaining the intake pipe pressure.

[Fourth Embodiment]

Next, a fourth embodiment will be described below.

Figure 23:
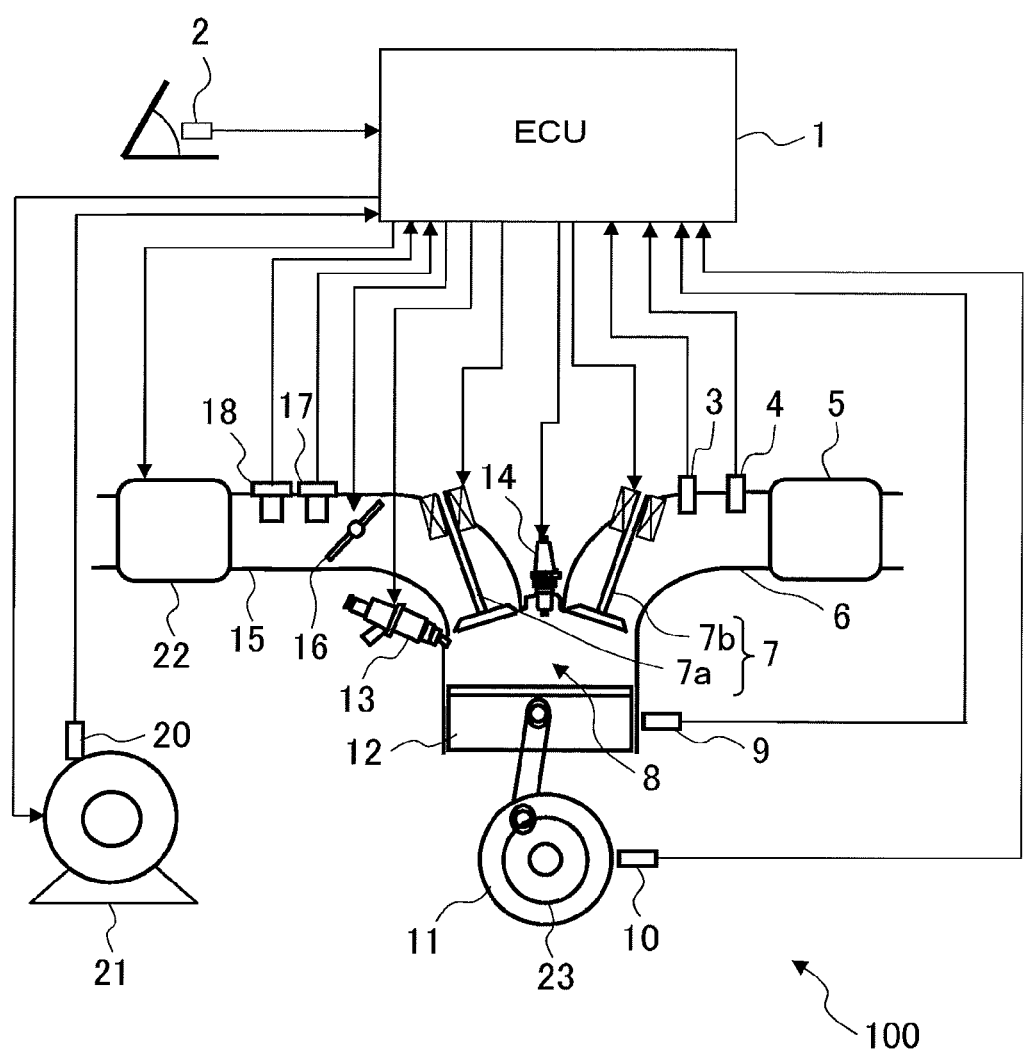
[FIG. 23] A diagram for illustrating a system configuration of an automobile gasoline engine to which a control apparatus of an internal combustion engine in a fourth embodiment is applied.

FIG. 23 is a diagram for illustrating a system configuration of an automobile gasoline engine to which a control apparatus of an internal combustion engine in the fourth embodiment is applied. It should be noted that since the same constituent elements as the above embodiments are given the same reference signs, detailed description thereof will be omitted.

The engine 100 is provided with a power generation motor 23 capable of transmitting motive power via the same axis of the crankshaft 11 or a motive power transmission mechanism such as a belt and a gear. A function of the power generation motor 23 is not limited to power generation. For example, the power generation motor can also be used as an electric motor for rotating the crankshaft 11 upon receiving supply of electricity.

Figure 24:
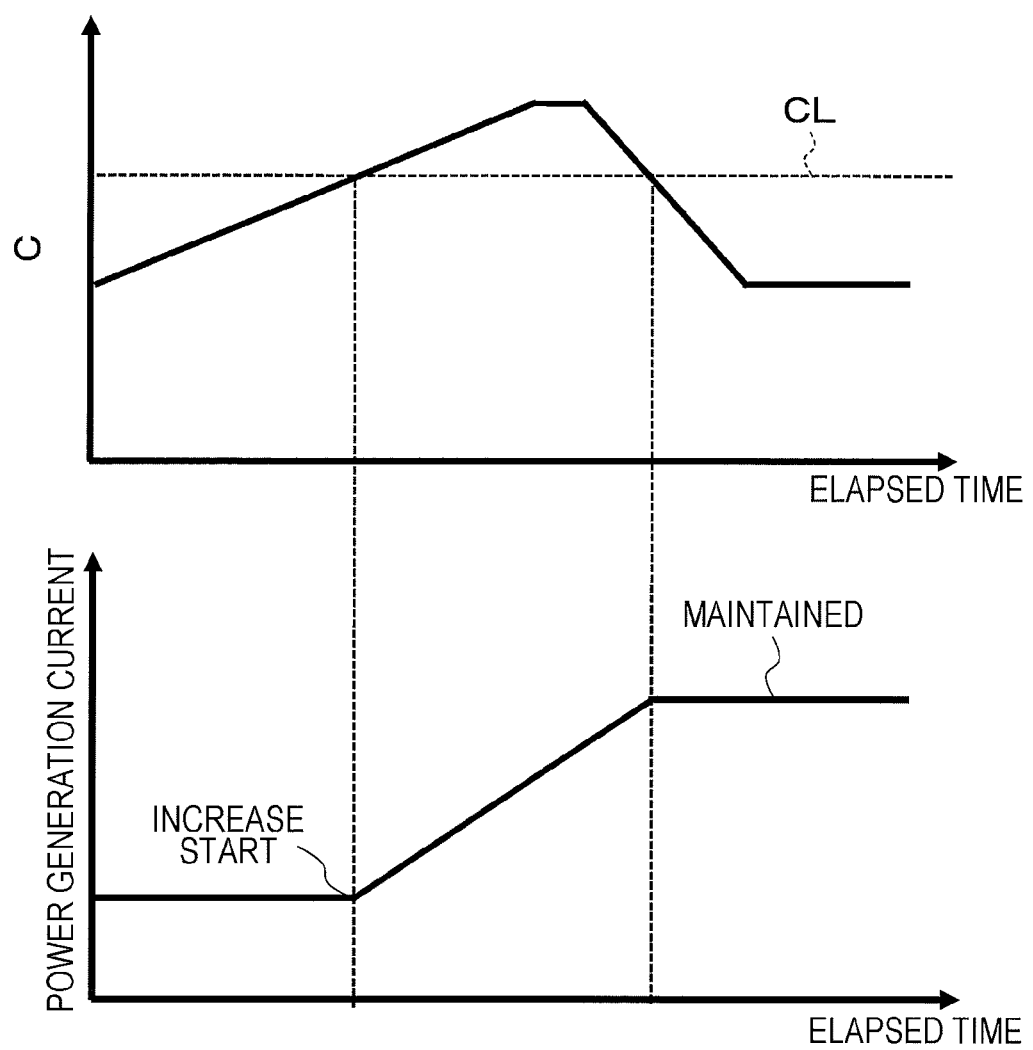
[FIG. 24] A diagram for illustrating contents of combustion change suppression control when the compression ignited combustion FLG is turned ON in the fourth embodiment.

FIG. 24 is a diagram for illustrating contents of combustion change suppression control when the compression ignited combustion FLG is turned ON in the present embodiment.

In the present embodiment, control for increasing a power generation current of the power generation motor 23 to increase a load of the engine 100 is performed as the control for suppressing the combustion change when the compression ignited combustion FLG is turned ON. The ECU 1 compares the change indicator C calculated by the change indicator calculation unit 39 and the predetermined threshold value CL, and starts the power generation current increase control for increasing the power generation current of the power generation motor 23 when the change indicator C becomes the threshold value CL or more (increase start).

By such power generation current increase control, in accordance with a gradual increase in the power generation current, the load of the engine 100 is increased. Therefore, the combustion is stabilized, the combustion change is decreased, and the change indicator C is no more increased but lowered.

By maintaining the power generation current when the change indicator C becomes less than the threshold value CL again, the combustion change can be suppressed. In the present embodiment, the power generation current when the change indicator C becomes less than the predetermined threshold value CL is maintained. However, the power generation current when the change indicator gets smaller than the threshold value CL may be maintained.

By performing the power generation current increase control when the combustion change is generated in the compression ignited combustion, the combustion change can be suppressed. This is because failure of self-ignition is generated in a state that the combustion change is large in the compression ignited combustion and in order to suppress this, enrichment of the air-fuel mixture in the combustion chamber for facilitating the self-ignition is effective. The increase in the power generation current in the present control increases the requested torque of the engine 100, so as to efficiently enrich the air-fuel mixture in the combustion chamber and also steadily suppress the combustion change by maintaining the power generation current.

[Fifth Embodiment]

Figure 25:
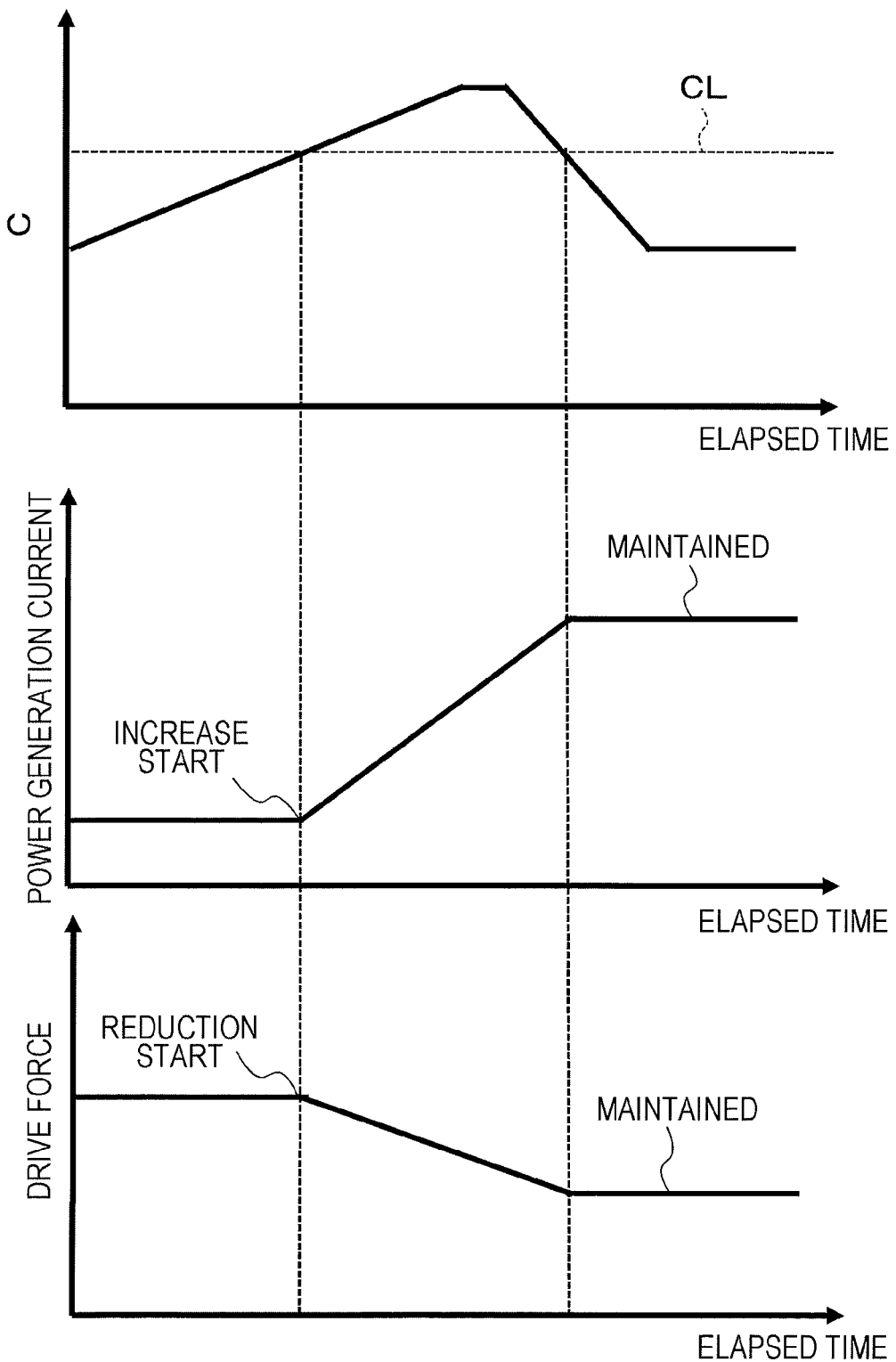
[FIG. 25] A diagram for illustrating contents of combustion change suppression control when the compression ignited combustion FLG is turned ON in a fifth embodiment.

FIG. 25 is a diagram for illustrating contents of combustion change suppression control when the compression ignited combustion FLG is turned ON in the present embodiment.

In the present embodiment, an example that the present invention is applied to a hybrid vehicle in which the engine 100 and a power generation and driving electric motor are mounted or the like will be described. Control for increasing the power generation current of the electric motor and reducing the drive force so as to increase the load of the engine 100 is performed as the control for suppressing the combustion change when the compression ignited combustion FLG is turned ON.

The ECU 1 compares the change indicator C calculated by the change indicator calculation unit 39 and the predetermined threshold value CL, and starts the control for increasing the power generation current of the electric motor (increase start) and reducing the drive force (reduction start) when the change indicator C becomes the threshold value CL or more.

By such control of the electric motor, in accordance with an increase in the power generation current and reduction in the drive force, the load of the engine 100 is increased. Therefore, the combustion is stabilized, the combustion change is decreased, and the change indicator C is no more increased but lowered.

By maintaining the power generation current and the drive force when the change indicator C becomes less than the threshold value CL again, the combustion change can be suppressed. In the present embodiment, the power generation current and the drive force when the change indicator C becomes less than the predetermined threshold value CL are maintained. However, the power generation current and the drive force when the change indicator gets smaller than the threshold value CL may be maintained.

By performing the control of the electric motor for increasing the power generation current and reducing the drive force when the combustion change is generated in the compression ignited combustion, the combustion change can be suppressed. This is because failure of self-ignition is generated in a state that the combustion change is large in the compression ignited combustion and in order to suppress this, the enrichment of the air-fuel mixture in the combustion chamber for facilitating the self-ignition is effective. The increase in the power generation current and the reduction in the drive force in the present control increase the requested torque of the engine 100, so as to efficiently enrich the air-fuel mixture in the combustion chamber and also steadily suppress the combustion change by maintaining the power generation current and the drive force.

[Sixth Embodiment]

Figure 26:
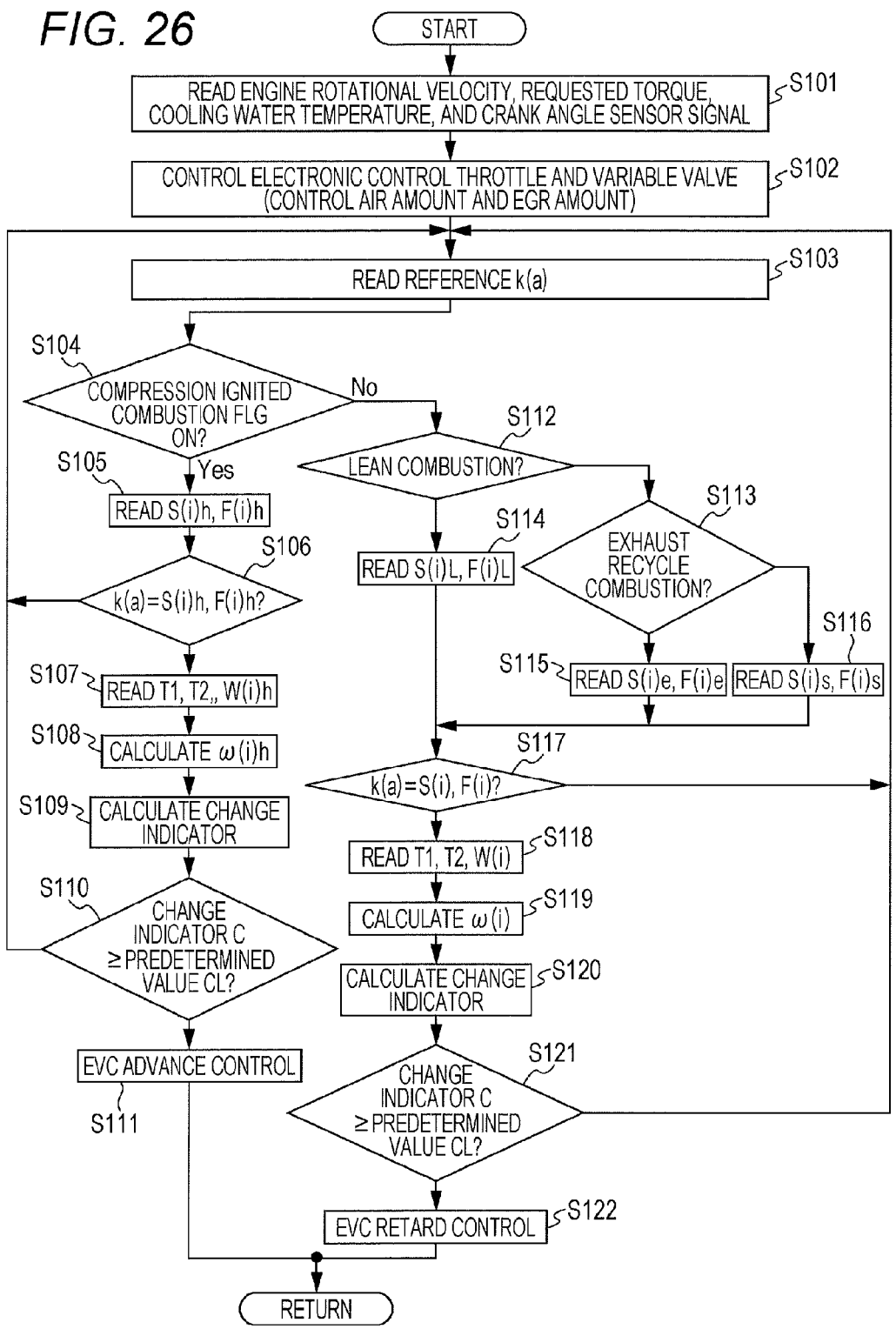
[FIG. 26] A flowchart for illustrating control contents of combustion change suppression control in a sixth embodiment.

FIG. 26 is a flowchart showing control contents in the present embodiment. It should be noted that since the same constituent elements as the above embodiments are given the same reference signs, detailed description thereof will be omitted.

A characteristic point in the present embodiment is the control for suppressing the combustion change is performed in combustion modes of the spark ignited combustion, the compression ignited combustion, lean combustion, and exhaust recycle combustion.

The control contents shown in FIG. 26 are repeatedly executed by the ECU 1 on a predetermined cycle.

Since the processing of Steps S101 to S111 is the same as the control in the compression ignited combustion in the above first embodiment, description thereof will be omitted.

In a case where it is determined that the compression ignited combustion FLG is turned OFF in Step S104, the ECU 1 determines whether or not the combustion mode is the lean combustion in Step S112. In a case where it is determined that the combustion mode is the lean combustion, in Step S114, a detection start timing $S(i)L$ and a detection completion timing $F(i)L$ for the lean combustion are read.

In a case where it is determined that the combustion mode is not the lean combustion in Step S112, it is determined whether or not the combustion mode is the exhaust recycle combustion in Step S113. In a case where it is determined that the combustion mode is the exhaust recycle combustion, in Step S115, a detection start timing S(i)e and a detection completion timing F(i)e for the exhaust recycle combustion are read.

In a case where it is determined that the combustion mode is not the exhaust recycle combustion in Step S113, the detection start timing S(i)s and the detection completion timing F(i)s for the spark ignited combustion are read in Step S116.

Regarding the detection start timing S(i) and the detection completion timing F(i) read in Step S114, Step S115, or Step S116, next in Step S117, it is determined whether or not the reference k(a) read in Step S103 is equal to the detection start timing S(i) and the detection completion timing F(i).

In a case where non-equality is determined in Step S117, the proceeding is returned to Step S103 and the reference k(a) is read again. Meanwhile, in a case where equality is determined in Step S117, that is, in a case where it is determined that the reference k(a) read in Step S103 is equal to the detection start timing S(i) and the detection completion timing F(i), in Step S118, the clock values T1, T2 of the internal clock of the ECU 1 at the references k(a) corresponding to the detection start timing S(i) and the detection completion timing F(i) and the detection rotation angle W(i) are read.

Next, in Step S119, by using the clock values T1, T2 and the detection rotation angle W(i), the angular velocity ω(i) of the crankshaft 11 is calculated. Then, in Step S120, the change indicator C of the angular velocity ω(i) calculated in Step S119 is calculated.

Next, in Step S121, it is determined whether or not the change indicator C is the threshold value CL or more. In a case where the change indicator C is not the threshold value CL or more, that is, the change indicator C is less than the threshold value CL (NO in Step S121), the proceeding is returned to Step S103 and the reference k(a) is read again. In a case where it is determined that the change indicator C is the threshold value CL or more (YES in Step S121), the proceeding is moved to Step S122, the EVC retard control for increasing the EVC retard amount is performed, and then the control of the present flow is finished.

According to the engine 100 of the present embodiment, the angular velocity of the crankshaft 11 is detected at the detection time and for the detection duration set in accordance with the combustion modes of the compression ignited combustion, the lean combustion, the exhaust recycle combustion, and the spark ignited combustion, and the combustion stability is determined based on the detected angular velocity of the crankshaft 11. Thus, the combustion change in the combustion modes can be accurately detected. By performing the EVC advance control or the EVC retard control based on the detected combustion change and altering the activation timing of the valve mechanism, the combustion change is suppressed, so that the combustion stability of the internal combustion engine can be improved.

Reference Signs List
1 ECU
2 accelerator opening sensor
3 exhaust temperature sensor
4 air-fuel ratio sensor
5 ternary catalyst
6 exhaust pipe
7a intake valve variable device
7b exhaust valve variable device
8 combustion chamber
9 cooling water temperature sensor
10 crank angle sensor
11 crankshaft
12 piston
13 injector
14 ignition plug
15 intake pipe
16 electronic control throttle
17 intake temperature sensor
18 air flow sensor
20 fuel pressure sensor
21 fuel pump
22 supercharger
100 engine
31 input circuit
32 input/output port
33 RAM
34 ROM
35 CPU
36a electronic control throttle drive circuit
36b injector drive circuit
36c ignition output circuit
36d variable valve drive circuit
36e fuel pump drive circuit
36f supercharger drive circuit

The invention claimed is:

1. A control apparatus of an internal combustion engine operable upon switching a combustion mode, comprising:
a detection timing setting means for setting a detection time and a detection duration to detect a sensor signal of a crank angle sensor in accordance with the combustion mode;
a combustion change determination means for determining whether or not there is a combustion change based on the sensor signal detected by the crank angle sensor at the detection time and for the detection duration set by the detection timing setting means; and
a combustion change suppression control means for controlling to suppress the combustion change of the internal combustion engine in a case where the combustion change determination means determines that there is the combustion change, wherein
the combustion mode includes compression ignited combustion and spark ignited combustion,
the detection timing setting means, in a case where the combustion mode is the compression ignited combustion, shortens the detection duration and advances the detection time in comparison to the spark ignited combustion,
the combustion change suppression control means, in a case where determination of the combustion change determination means is altered from the combustion change to non-combustion change as a result of suppression control of the combustion change, maintains a combustion change suppression control state at a time point when the determination is altered, and
the combustion change suppression control means controls to suppress the combustion change of the internal combustion engine based on a rotation angle and an angular velocity of a crankshaft obtained from the sensor signal of the crank angle sensor.

2. A control apparatus of an internal combustion engine operable upon switching a combustion mode, comprising:
a detection timing setting means for setting a detection time and a detection duration to detect a sensor signal of a crank angle sensor in accordance with the combustion mode;

a combustion change determination means for determining whether or not there is a combustion change based on the sensor signal detected by the crank angle sensor at the detection time and for the detection duration set by the detection timing setting means; and a combustion change suppression control means for controlling to suppress the combustion change of the internal combustion engine in a case where the combustion change determination means determines that there is the combustion change, wherein the combustion mode includes compression ignited combustion and spark ignited combustion, the detection timing setting means, in a case where the combustion mode is the compression ignited combustion, shortens the detection duration and advances the detection time in comparison to the spark ignited combustion, in a case where the internal combustion engine includes a variable valve mechanism, the combustion change suppression control means alters an activation timing of the variable valve mechanism based on the sensor signal, and the combustion change suppression control means advances a timing to close an exhaust valve of the variable valve mechanism when the combustion mode is the compression ignited combustion, and retards the timing to close the exhaust valve of the variable valve mechanism when the combustion mode is the spark ignited combustion.

3. A control apparatus of an internal combustion engine operable upon switching a combustion mode, comprising:

a detection timing setting means for setting a detection time and a detection duration to detect a sensor signal of a crank angle sensor in accordance with the combustion mode;

a combustion change determination means for determining whether or not there is a combustion change based on the sensor signal detected by the crank angle sensor at the detection time and for the detection duration set by the detection timing setting means; and a combustion change suppression control means for controlling to suppress the combustion change of the internal combustion engine in a case where the combustion change determination means determines that there is the combustion change, wherein the combustion mode includes compression ignited combustion and spark ignited combustion, the detection timing setting means, in a case where the combustion mode is the compression ignited combustion, shortens the detection duration and advances the detection time in comparison to the spark ignited combustion, and in a case where the internal combustion engine includes a fuel injection device, the combustion change suppression control means increases a fuel injection duration of the fuel injection device.

4. The control apparatus of the internal combustion engine according to claim 1, further comprising:

a variable valve mechanism, a fuel injection device, a supercharger, a power generation motor, or an electric motor capable of generating power and driving, wherein based on the sensor signal, an activation timing of the variable valve mechanism, a fuel injection duration of the fuel injection device, a supercharging pressure of the supercharger, a power generation current of the power generation motor, or a power generation current and a drive force of the electric motor is changed.

5. The control apparatus of the internal combustion engine according to claim 1, wherein a failure of the crank angle sensor is judged based on the sensor signal, and in a case of judging the failure of the crank angle sensor, the compression ignited combustion is not performed.

6. The control apparatus of the internal combustion engine according to claim 1, wherein the detection timing setting means, in a case where the combustion mode is the compression ignited combustion, sets the detection time and the detection duration to include a peak time of a combustion pressure in a combustion chamber of the internal combustion engine.

7. The control apparatus of the internal combustion engine according to claim 2, further comprising:

a variable valve mechanism, a fuel injection device, a supercharger, a power generation motor, or an electric motor capable of generating power and driving, wherein based on the sensor signal, an activation timing of the variable valve mechanism, a fuel injection duration of the fuel injection device, a supercharging pressure of the supercharger, a power generation current of the power generation motor, or a power generation current and a drive force of the electric motor is changed.

8. The control apparatus of the internal combustion engine according to claim 2, wherein a failure of the crank angle sensor is judged based on the sensor signal, and in a case of judging the failure of the crank angle sensor, the compression ignited combustion is not performed.

9. The control apparatus of the internal combustion engine according to claim 2, wherein the detection timing setting means, in a case where the combustion mode is the compression ignited combustion, sets the detection time and the detection duration to include a peak time of a combustion pressure in a combustion chamber of the internal combustion engine.

10. The control apparatus of the internal combustion engine according to claim 3, further comprising:

a variable valve mechanism, a fuel injection device, a supercharger, a power generation motor, or an electric motor capable of generating power and driving, wherein based on the sensor signal, an activation timing of the variable valve mechanism, a fuel injection duration of the fuel injection device, a supercharging pressure of the supercharger, a power generation current of the power generation motor, or a power generation current and a drive force of the electric motor is changed.

11. The control apparatus of the internal combustion engine according to claim 3, wherein a failure of the crank angle sensor is judged based on the sensor signal, and in a case of judging the failure of the crank angle sensor, the compression ignited combustion is not performed.

12. The control apparatus of the internal combustion engine according to claim 3, wherein the detection timing setting means, in a case where the combustion mode is the compression ignited combustion, sets the detection time and the detection duration to include a peak time of a combustion pressure in a combustion chamber of the internal combustion engine.

* * * * *